(12) United States Patent
Molbo et al.

(10) Patent No.: US 12,241,306 B2
(45) Date of Patent: Mar. 4, 2025

(54) LAMINATED VACUUM INSULATED GLASS UNIT

(71) Applicant: VKR HOLDING A/S, Hørsholm (DK)

(72) Inventors: Jacob Christian Molbo, Hørsholm (DK); Marcus Rudi Frank, Hørsholm (DK); Erik Leth Frisenvad, Hørsholm (DK); Utku Ahmet Özden, Hørsholm (DK); Kristian Damholdt Jørgensen, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 857 days.

(21) Appl. No.: 17/266,278

(22) PCT Filed: Aug. 23, 2019

(86) PCT No.: PCT/EP2019/072583
§ 371 (c)(1),
(2) Date: Feb. 5, 2021

(87) PCT Pub. No.: WO2020/043614
PCT Pub. Date: Mar. 5, 2020

(65) Prior Publication Data
US 2021/0301588 A1    Sep. 30, 2021

(30) Foreign Application Priority Data
Aug. 30, 2018   (DK) .................. 201870559

(51) Int. Cl.
*B32B 17/10*    (2006.01)
*B32B 3/26*     (2006.01)
(Continued)

(52) U.S. Cl.
CPC ........... *E06B 3/6775* (2013.01); *B32B 3/266* (2013.01); *B32B 17/10055* (2013.01);
(Continued)

(58) Field of Classification Search
CPC .............. B32B 3/266; B32B 17/10055; B32B 17/10293; E06B 3/6612; E06B 3/677; E06B 3/6775; Y02B 80/22; Y02A 30/249
See application file for complete search history.

(56) References Cited

U.S. PATENT DOCUMENTS 5,664,395 A  *  9/1997  Collins .................. E06B 3/677
                                            52/786.13
2005/0217319 A1* 10/2005 Yoshizawa .......... E06B 3/67339
                                            65/34

(Continued)

FOREIGN PATENT DOCUMENTS

CN      2835403     *  11/2006
CN      2835403 A      11/2006

(Continued)

OTHER PUBLICATIONS

Machine translation of JP 2004/323317 A.*

(Continued)

*Primary Examiner* — Z. Jim Yang
(74) *Attorney, Agent, or Firm* — CANTOR COLBURN LLP

(57) ABSTRACT

The present disclosure relates to a laminated vacuum insulated glass (VI G) unit (100) comprising a vacuum insulated glass unit (1) comprising first and second glass sheets (2a, 2b) separated by support structures (3) to provide a gap (4) between the glass sheets (2a, 2b), and an edge-sealing (5) enclosing and sealing said gap (4). An evacuation hole (6) extend to the gap (4) and is arranged in said first glass sheet (2a). A recessed portion (8) may enclose the evacuation hole (6), and a sealing system (7) seals the evacuation hole (6), The sealing system may be arranged in said recessed portion. A lamination layer (11) is arranged between a further sheet (12) and the first glass sheet (2a) comprising said evacuation hole (6). A part of said sealing system (7) extends (Continued)

Figure 1:
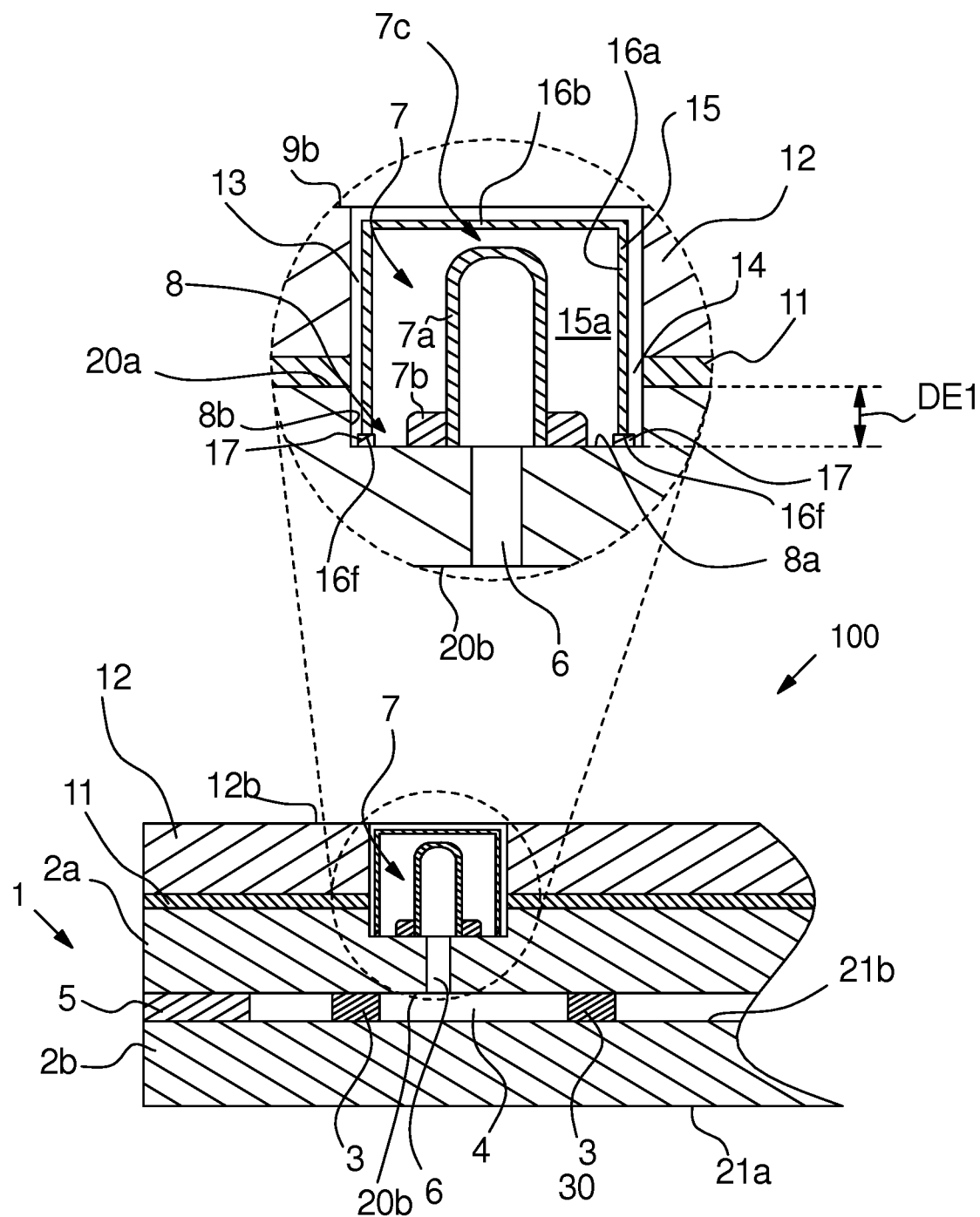

into a hole (13) in the further sheet (12), and an enclosure device (15) comprising one or more walls (16a, 16b) encloses at least a part of said sealing system (7) and extends into said hole (13) in the further sheet (12) and may also extend into said recessed portion (8). A cover (30) may be placed to cover the enclosure device and hole in the further sheet. The present disclosure moreover relate to methods and a building aperture covering such as a window or door.

9 Claims, 12 Drawing Sheets

(51) Int. Cl.
  *E06B 3/66*   (2006.01)
  *E06B 3/677*   (2006.01)
  *E06B 3/663*   (2006.01)
(52) U.S. Cl.
  CPC .. *B32B 17/10091* (2013.01); *B32B 17/10302* (2013.01); *E06B 3/6612* (2013.01); *E06B 3/66304* (2013.01); *E06B 2003/66338* (2013.01)

(56) References Cited

U.S. PATENT DOCUMENTS

| | | | |
|---|---|---|---|
| 2006/0005482 A1* | 1/2006 | Bennison | B32B 17/10036 52/204.5 |
| 2009/0324858 A1* | 12/2009 | Jaeger | E06B 3/6612 156/107 |
| 2012/0148795 A1* | 6/2012 | Kwon | H01J 9/40 428/131 |
| 2012/0285199 A1* | 11/2012 | Li | E06B 3/66357 65/154 |
| 2013/0302542 A1* | 11/2013 | Jones | E06B 3/6612 428/34 |
| 2013/0305785 A1* | 11/2013 | Dennis | E06B 3/6612 65/34 |
| 2017/0002603 A1* | 1/2017 | Veerasamy | C03C 17/3636 |
| 2018/0238103 A1* | 8/2018 | Jensen | E06B 3/67334 |
| 2018/0305972 A1* | 10/2018 | Stark | E06B 3/66357 |
| 2020/0123040 A1* | 4/2020 | Lian | E06B 3/6775 |
| 2021/0199367 A1* | 7/2021 | Kim | E06B 3/6617 |

FOREIGN PATENT DOCUMENTS

| | | | | |
|---|---|---|---|---|
| CN | 107265889 A | * | 10/2017 | |
| EP | 3170799 A1 | | 5/2017 | |
| JP | 2004323317 A | * | 11/2004 | |
| KR | 20160142210 A | * | 12/2016 | |
| WO | WO-9748650 A1 | * | 12/1997 | ........... E06B 3/6775 |
| WO | WO-2018142077 A1 | * | 8/2018 | |

OTHER PUBLICATIONS

Machine translation of CN 107265889 A.*
Machine translation of KR 2016/0142210 A.*
International Search Report for corresponding application PCT/PCT/EP2019/072583 filed Aug. 23, 2019; Mail date Oct. 4, 2019.
Written Opinion of the International Searching Authority for corresponding application PCT/PCT/EP2019/072583 filed Aug. 23, 2019; Mail date Oct. 4, 2019.

* cited by examiner

LAMINATED VACUUM INSULATED GLASS UNIT

BACKGROUND

The present disclosure relates to laminated vacuum insulated glass units, methods of providing vacuum insulated glass units, and a building aperture cover comprising a laminated vacuum insulated glass unit.

BACKGROUND

A desire to laminate vacuum insulated glass (VIG) units is present to for example improve safety in case a glass sheet of the VIG unit breaks. A VIG unit may typically comprise glass sheets kept separated by support structures arranged in an airtight and evacuated gap between the glass sheets. When evacuating the gap between the glass sheets, this may be provided through an evacuation hole extending to the gap and arranged in one of the glass sheets of the VIG unit. The evacuation may be provided in a vacuum chamber or by means of an evacuation cup arranged to cover the evacuation hole. After the evacuation, the evacuation hole is sealed by means of a sealing system so as to provide an airtight seal to maintain the reduced pressure in the gap provided during the evacuation.

However, when subsequently laminating the VIG unit, the lamination process may endanger the sealing system and thus risk that the airtight sealing breaks.

U S 2013/0302542 relates to a VIG unit comprising a protective ring arranged to surround and thus protect a sealing system comprising a glass tube. The protective ring may be attached to the VIG unit by means of an adhesive tape.

CN 2835403Y discloses a laminated VIG unit comprising a lamination glass sheet laminated to a VIG unit by means of a lamination layer. A cover is placed to cover an evacuation tube.

However, the above mentioned solutions may for example suffer from drawbacks such as drawbacks with regards to reduced manufacturing speed and/or reliability, inadequate protection during manufacturing and/or aesthetic disadvantages which the present disclosure may reduce or solve.

SUMMARY

Generally, it may be advantageous to laminate vacuum insulated glass (VIG) units for safety reasons in order to reduce the risk of human or animals getting hurt by glass pieces of the VIG unit in case the VIG unit is damaged. The lamination process is normally provided after the VIG unit has been produced, in the sense that the glass sheets of the VIG units have been paired with the support structures arranged to maintain the gap between the glass sheets, the pressure in the gap has been reduced, and the gap has then subsequently been sealed by a sealing system to maintain the reduced pressure before the lamination process is provided. This sealing system may extend from a surface of the glass sheet comprising an evacuation opening/hole used during evacuation of the gap.

When laminating the VIG unit, the sealing system may however be considered a weak point/area that may break due to e.g. mechanical forces acting on the sealing system, and if the sealing system breaks, the pressure in the gap rises and equalizes with the atmospheric pressure, and the VIG unit needs to be discarded as the insulating properties provided by the evacuated gap disappears.

When laminating the VIG unit, this requires that a lamination layer/sheet or sheets is/are placed at a major surface of the VIG unit, and also that a further sheet, such as a glass sheet, is arranged so that the lamination sheet is placed between the further sheet and the glass sheet, and then the lamination layer is typically heated to bond to the VIG unit and the further sheet respectively.

The present disclosure relates in a first aspect to a laminated vacuum insulated glass (VIG) unit comprising:
 a vacuum insulated glass unit comprising first and second glass sheets separated by support structures to provide a gap between the glass sheets, and an edge-sealing enclosing and sealing said gap,
 an evacuation hole extending to the gap and arranged in said first glass sheet,
 a recessed portion in the outer surface of the first glass sheet, wherein said recessed portion encloses said evacuation hole,
 a sealing system sealing the evacuation hole, wherein the sealing system is arranged in said recessed portion, and
 a lamination layer arranged between a further sheet and the first glass sheet comprising said evacuation hole,
 wherein a part of said sealing system may extend into a hole in the further sheet, and
 wherein an enclosure device comprising one or more walls encloses at least a part of said sealing system and extends into said hole in the further sheet and into said recessed portion.

For example, placing the lamination layer and the further sheet at the glass sheet comprising the evacuation opening may provide that these parts gets rather close to the sealing system, and increase the risk of breaking a part of the sealing system. Thus, it may be relevant to place a hollow enclosure device to protect the sealing system from external forces provided during e.g. the lamination process and/or a prior cleaning process.

Placing the enclosure device to at least partly enclose the sealing system may require high precision to assure that the enclosure device sufficiently encloses the sealing system. If the enclosure device is not arranged precise enough, this may require that the opening in the lamination layer and/or the further sheet may need to be larger in order to allow a larger tolerance for arrangement of the enclosure device, it may require a larger enclosure device to allow more freedom during placement of the enclosure device, and/or the like. This may for example compromise desired aesthetic impression of the VIG unit.

However, by arranging the enclosure device so that it extend from a recessed portion and support on/connect to a surface in the recessed portion, this may help to provide an easier and/or faster, more precise placement of the enclosure device, and/or may help to provide an improved precision during placement which in the end may allow that a hole in the lamination layer and/or the further sheet may be smaller.

For example, the recessed portion may act as a guide that guides the enclosure device in place and/or may help to keep the enclosure device in place when arranging the lamination layer and the further sheet, for example as the side walls of the recessed portion may help to prevent or reduce the risk of that forces or force components parallel to the outer surface of the first glass sheet will not push the enclosure device to strike the sealing system.

The recessed protection may thus e.g. help to reduce the risk of the enclosure device being placed at an undesired location where it may contact the sealing system and break the vacuum.

Experiments have shown that micro cracks may occur around the evacuation hole during or after evacuation of the gap. The enclosure device may e.g. also help to protect such areas that may be subjected to such micro-cracks.

The further sheet may in one or more aspects of the present disclosure be a glass sheet such as an annealed or tempered, e.g. thermally tempered, glass sheet, it may be a polymer sheet/plate, such as a polymer sheet/plate transparent to at least visible light and/or the like.

In one or more aspects of the present disclosure, said enclosure device may be attached to one or more surfaces of said recessed portion by means of an adhesive.

This may e.g. provide that the enclosure device may withstand larger mechanical forces from e.g. the lamination layer and/or the further sheet when these are placed prior to the lamination process, without being at least partly moved/displaced in the recessed portion of the first glass sheet.

The recessed portion may also in one or more aspects of the present disclosure provide a larger connection surface for the adhesive as both side wall and recessed "bottom" wall/surface of the recessed portion may be used for bonding of the adhesive attaching the enclosure device to the surface or surfaces of the recessed portion. This may e.g. provide an improved fixation of the enclosure device.

The adhesive may e.g. comprise a silicone material and/or an acrylic adhesive, it may comprise a PVB layer o EVA layer and/or the like. The adhesive may e.g. be placed to face and attached to a surface in the recessed portion of the first glass sheet facing away from the gap.

In one or more aspects of the present disclosure, said enclosure device comprises a connection flange providing a connection surface connected to a surface of said recessed portion, such as by means of an adhesive.

This may e.g. help to provide a larger surface to be attached to the surface of the recced portion by means of an adhesive, in aspects where an adhesive is used for attaching the enclosure device to the glass sheet.

The flange may also or alternatively help to at least partly centre the enclosure device in the recessed portion when placing the enclosure device.

In one or more aspects of the present disclosure, said enclosure device may comprises a top wall extending over the top of the sealing system so as to cover the top of the sealing system. The enclosure device may thus in one or more aspects of the present disclosure be/provide a cap.

This may e.g. help to provide an improved protection of the sealing system, and/or an improved aesthetic appearance.

The enclosure device comprising a top wall may also in one or more aspects of the present disclosure provide a protection of the sealing system and the area of the first glass sheet surrounding the evacuation hole during a cleaning process of the glass sheet by using e.g. a liquid, for example a liquid comprising a cleaning agent, a gas and/or cleaning devices such as brushes and/or fabric materials before the lamination layer and further sheet are provided. This cleaning may e.g. be provided by means of an automated cleaning device/station.

It is however understood that in one or more other aspects of the present disclosure, said enclosure device may be open at the end opposite the end of the enclosure device that is proximate the recessed portion. This may e.g. help to obtain a reduced height of the enclosure device compared to solutions where the enclosure device comprises a part, such as a top wall extending over the top of the sealing system. It may moreover or alternatively provide a solution wherein the enclosure device may be placed before the sealing system is sealed, and that the sealing system may still be accessed during the sealing operation to seal the gap after evacuation.

It is understood that in one or more aspects of the present disclosure, the height of said enclosure device may be larger than the height of said sealing system, at least after the sealing system has been sealed to seal said gap. This may e.g. help to provide an improved protection of the sealing system. However, if the enclosure device is e.g. open at the top, the height of the enclosure device may in one or more aspects of the present disclosure be smaller than or substantially equal the height of said sealing system.

In one or more aspects of the present disclosure, the top of said enclosure device may be arranged to be below or in the level of a plane defined by the outer major surface of the further sheet.

This may e.g. provide a more space saving enclosure solution and/or may help to provide a desirable aesthetic appearance. It may also help to reduce the risk that outer forces, after the lamination process has been finished may act on the enclosure device, and may thus provide a laminated VIG unit with improved resistance to outer forces so that the risk of damaging the reduced pressure in the gap between the VIG unit glass sheets may be reduced.

Generally, said recessed portion in the first glass sheet of the VIG unit may in one or more aspects of the present disclosure have a width which is less than 20 mm, such as less than 12 mm, e.g. less than 10 mm, such as less than 7 mm.

This may help to provide a desired aesthetic appearance of the laminated VIG unit as a small area for the enclosure device may be is provided and e.g. so that a cover member for providing a cover for the sealing system and enclosure device may be smaller, in aspects of the present disclosure where such a cover device is used.

Generally, in one or more aspects of the present disclosure, a cover may be fixed to one or more parts of the laminated VIG unit, so as to cover said sealing system and enclosure device.

The cover may provide an improved visual/aesthetic appearance of the laminated VIG unit as it may at least partly or fully visually cover the recessed portion, sealing system and enclosure device, so as to prevent or reduce the view to the sealing system and enclosure device when looking at the outer surface of the further sheet of the laminated VIG unit.

The cover, such as a cover member, may e.g. in one or more aspects comprise a metal layer, a painted layer, a glass layer with changes in a refractive index different than the refractive index different of the further glass sheet and/or the like, and/or it may comprise a cover member such as a cap or plate.

The cover may also in further aspects of the present disclosure substantially completely cover said hole in the further sheet.

The width/diameter of the cover may in one or more aspects of the present disclosure be below 30 mm such as below 20 mm, e.g. below 18 mm such as about or below 15 mm. The width/diameter of the cover may in one or more aspects of the present disclosure be above 8 mm such as above 10 mm, e.g. above 13 mm such as about or above 15 mm. For example, in one or more embodiments of the present disclosure, the width of the cover may be between 8 mm and 30 mm, such as between 9 mm and 20 mm, e.g. between 10 mm and 17 mm.

Said cover may in one or more aspects of the present disclosure be a cover member attached to said further sheet such as by means of an adhesive and/or a friction force.

This may e.g. provide an easy and fast mounting of the cover. This may e.g. be obtained by means of an adhesive such as a glue, adhesive tape and/or the like. In one or more other aspects, the cover may be attached by means of mechanical fasteners such as a latch/notch system, a thread, a spring member, by means of friction and/or a socket system, and/or by a combination of mechanical fasteners and an adhesive.

The cover may in one or more aspects of the present disclosure comprise a cover member such as a cover plate or a cap. The cover member may e.g. be made e.g. from e.g. a metal, a glass material and/or a polymer material, such as a plate made from one or more of these materials, and may adhere to the further sheet and/or the enclosure device by means of an adhesive layer and/or one or more mechanical fasteners.

The cover may in one or more aspects of the resent disclosure have a width (or diameter depending on the cover shape) which is larger than the width/diameter between the opposing inner walls of the hole in the further sheet so as to be able to be attached to the further sheet either a surface in a recessed portion and/or at the outer major surface of the further sheet.

In one or more aspects, where the cover is a cap or plate, the cover may help to provide a protection against mechanical forces, and thus have a structural strength given by the corner member material itself, e.g. in combination with the attachment solution such as adhesive and/or a mechanical arrangement attaching the cover member to the laminated VIG unit.

In one or more aspects of the present disclosure, the cover member may have a circular or oval shape, it may be polygonal shaped such as shaped as a rectangle, a pentagon, hexagon, heptagon, octagon, it may be oval and/or the like.

In one or more aspects of the present disclosure, said cover may be arranged recessed in the outer major surface of said further sheet.

This may e.g. help to protect the cover from mechanical forces in the final laminated VIG unit, it may help to provide that the cover may provide a desired aesthetic appearance by reducing the extent of the cover above the outer major surface of the further sheet while at the same time being able to use a cover made from a material and/or having a thickness providing an improved structural strength and/or the like.

Generally, in one or more aspects of the present disclosure, said cover may be attached to the further sheet and/or the enclosure device by means of the lamination layer material.

In one or more aspects of the present disclosure, a bonding, such as an adhesive bonding, is provided between the enclosure device and a surface of said cover facing the VIG unit, such as a bonding between a top surface of a top wall of the enclosure device and a surface said cover.

This may e.g. help to provide an improved attachment of the cover and/or a long lasting solution where the cover remains in the desired position. This may e.g. be advantageous as the laminated VIG unit may be used for many years, such as more than 10 years, e.g. more than 15 years such as around 20 years or even more, and be exposed to various conditions such as UV light and mechanical forces due to weather and/or objects striking the laminated VIG unit.

Bonding the cover to the enclosure device may also provide an increased bonding surface for the cover providing that the dimensions of the cover, such as the width/diameter of the cover may be reduced as e.g. a surface for attaching the cover to the further sheet by e.g. an adhesive may be reduced.

The bonding between the cover and enclosure device may e.g. be provided by means of the lamination layer when heating and softening the lamination layer, it may be provided by means of an adhesive material placed between the cover and the enclosure device to bond to these, it may be provided by means of a mechanical connection and/or the like.

In one or more aspects, the bonding may improve the mechanical resistance performance of the cover as the bonding may provide a support structure between the inner surface of said cover and the enclosure device such as a top wall of the enclosure device.

In one or more aspects of the present disclosure, said sealing system may comprise an evacuation tube and a sealing portion providing a seal between the evacuation tube and the first glass sheet comprising said recessed portion.

Such sealing systems may e.g. be advantageous to use for sealing an evacuation hole in a glass sheet of a VIG unit, but a part of this type of sealing system may extent from the surface of the VIG unit and here be vulnerable during e.g. lamination. The evacuation tube may e.g. have been sealed by melting the free end of the tube or by a mechanical compression of the wall of the tube after an evacuation of the gap.

In one or more aspects of the present disclosure, said enclosure device and a tube of said sealing system may support on and/or connect to the same recessed surface of the recessed portion in the first glass sheet.

This may e.g. provide a more simple solution seen from a manufacturing perspective.

In one or more aspects of the present disclosure, said recessed portion may comprise a first recessed surface and a second recessed surface, wherein the second recessed surface is arranged closer to said gap than the first recessed surface, and wherein said enclosure device connects with said first recessed surface and/or wherein said sealing system at least partly cover said second recessed surface.

This may e.g. provide an advantageous control of the placement of the enclosure device and/or control of the sealing system during manufacturing of the VIG unit and/or laminated VIG unit.

In one or more aspects of the present disclosure, said recessed portion in the first glass sheet may comprise an inclined guiding surface inclining in a direction towards a bottom surface of said recessed portion. This inclined surface may help to align the enclosure device at the desired position when placing the enclosure device to support at a surface in the recessed portion.

The first and second recessed surfaces may in one or more aspects be concentric surfaces, e.g. circular concentric surfaces, and or surfaces extending in parallel planes. In one or more aspects of the present disclosure, a part of the sealing system, such as an evacuation tube may support on/connect to the second recessed surface.

According to one or more aspects of the present disclosure, said glass sheets of the VIG unit may be tempered glass sheets such as thermally tempered glass sheets. Such tempered glass sheets provides an improved strength of the VIG unit, and may e.g. provide that the support structures may be placed with a larger mutual distance in the gap of the VIG unit, such as above 30 mm, e.g. above 40 mm, such as above 50 mm between proximate/neighbouring support structures.

It is generally understood that in one or more aspects of the present disclosure, said enclosure device may comprise a ring wall. The ring wall may be circular, it may be polygonal shaped such as shaped as a rectangle, a pentagon, hexagon, heptagon octagon and/or the like. This ring wall portion may extend to the opening in the further sheet from the recessed surface in the first sheet and enclose the sealing system.

It is generally understood that in one or more aspects of the present disclosure, the depth of the recessed portion may be at least 0.3 mm such as at least 0.5 mm, for example at least 0.8 mm e.g. at least 1.0 mm.

This may in one or more aspects of the present disclosure be measured between a surface of the recessed portion in connection with the enclosure device and the major outer major surface of the first glass sheet.

In one or more embodiments of the present disclosure, the recessed surface may be recessed more than 20% such as 30%, e.g. more than 40% of the average thickness of the first glass sheet. For example, the recessed surface may be recessed between 20% and 60% such as between 35% and 55% of the average thickness of the glass sheet.

In one or more aspects of the present disclosure, the said sealing system and a part of said enclosure device may extend through a cut-out in the lamination layer.

In one or more embodiments of the present disclosure, instead of a part of said sealing system and a part of said enclosure device extending into a cut-out in the lamination layer, said lamination layer may cover said sealing system and said enclosure device.

In one or more aspects of the present disclosure, said hole in the further sheet may be a through hole.

The through hole may e.g. be advantageous from a manufacturing perspective as it may be easy to manufacture.

In other aspects of the present disclosure, the hole in the further sheet may be a blind hole, which e.g. may provide a desired aesthetic appearance, such as provide an unbroken outer major surface of the further sheet. If a blind hole is used, it is understood that in further aspects, an adhesive or another material may be placed between the inner surface of the blind hole facing the VIG unit, and the enclosure device, and may attach to the enclosure device such as at a top surface/wall of the enclosure device, and attach to e.g. an inner surface of the blind hole, thereby e.g. helping to provide an improved mechanical strength in the region of the blind hole.

In one or more aspects of the present disclosure the lamination layer material may bond to said enclosure device, such as to the outer surface of a ring wall and/or to a top wall of said enclosure device.

This may e.g. provide an improved stability of at least the enclosure device after the lamination. The lamination material may e.g. flow to bond to the enclosure device when heated and thus softened. The recessed portion in the first sheet of the VIG unit may e.g. provide a larger bonding surface for this lamination sheet material in aspects where the lamination material flows to bond to a surface in this recessed portion.

The present disclosure moreover relates to a first method of providing a laminated vacuum insulated glass (VIG) unit, wherein said method comprises:
providing a vacuum insulated glass unit comprising first and second glass sheets separated by support structures to provide a gap between the glass sheets, and an edge-sealing enclosing and sealing said gap,
wherein said first glass sheet comprises an evacuation hole, wherein a recessed portion in the outer major surface of the first glass sheet encloses said evacuation hole, and wherein a sealing system sealing the evacuation hole is arranged in said recessed portion,
providing an enclosure device comprising one or more walls, and placing said enclosure device so that it extend into said recessed portion, and so that said one or more walls of the enclosure device encloses at least a part of said sealing system,
providing a lamination layer and a further sheet,
placing said lamination layer so that the lamination layer covers said outer major surface of the first glass sheet, and
placing the further sheet so that the lamination layer is placed between the further sheet and the first glass sheet of the VIG unit, and so that said one or more walls of the enclosure device extend into a hole in the further sheet.

It is generally understood that the methods disclosed in the present disclosure according to the various aspects mentioned above or below may provide one or more of the previously mentioned advantages or effects.

It is understood that the above mentioned VIG unit, lamination layer, further sheet and enclosure device may be referred to as a VIG unit lamination assembly in the present disclosure.

In one or more aspects of the present disclosure, said method may comprise heating said lamination layer so as to soften said lamination layer to bond the lamination layer to the first glass sheet of the VIG unit and to said further sheet. This may in one or more aspects also cause that the lamination layer material may be caused to bond to said enclosure device, such as to the outer surface of a ring wall and/or to a top wall of said enclosure device.

In one or more aspects of the present disclosure, said method may comprise attaching said enclosure device to a surface of the recessed portion by means of an adhesive.

In one or more aspects of the present disclosure, said method may comprise placing a cover, such as a cover member, over said hole in the further sheet so as to cover said sealing system and enclosure device, wherein the cover is attached to one or more parts of the VIG unit lamination assembly.

The cover may generally e.g. be placed before or after a heating step where the lamination layer is heated to soften. The cover may thus be attached to the further sheet, the enclosure device and/or the lamination layer, which may e.g. provide a bonding connection to the cover in one or more aspects of the present disclosure.

In one or more aspects of the present disclosure, said method may comprise attaching said cover to the further sheet, such as by means of an adhesive. This may e.g. be provided at a part of an outwardly facing surface of the further sheet.

In one or more aspects of the present disclosure, said method may comprise attaching said cover to the enclosure device, such as by means of an adhesive. This may e.g. be provided during a heating process to soften said lamination layer, and/or by means of another suitable type of adhesive.

In one or more aspects of the present disclosure, said method may comprise placing said cover in a recessed portion in the outer surface of the further sheet.

In one or more aspects of the present disclosure, said method may comprise arranging said lamination layer so that the enclosure device extends through a cut-out in the lamination layer.

Alternatively, in other aspects, the lamination layer may be placed to also extend over the exposed part/top of the enclosure device, and may thus not comprise a cut-out.

In one or more aspects of the present disclosure, said method may comprise cleaning said outer, major surface of the first glass sheet before placing said lamination layer and said further sheet.

The enclosure device comprising the one or more walls, such as a ring wall and e.g. also a top wall enclosing and protecting the sealing system and a part of the area around the evacuation opening/hole may protect the sealing system and an area around the evacuation hole/opening during the cleaning operation, and hereby reduce the risk of damaging the VIG unit at or near the evacuation hole. For example it may reduce the risk of the cleaning operation damages the sealing system and/or reduce the risk of liquid applied during the cleaning gets near or into the micro cracks.

In one or more aspects of the present disclosure, said cleaning may comprise a cleaning operation by means of one or more cleaning liquids and/or by using one or more cleaning devices such as brushes and/or fabric materials.

It is generally understood that the cleaning may in one or more embodiments of the present disclosure may be provided before the lamination layer is placed and after the enclosure device is placed.

The cleaning operation may in one or more aspects be provided by means of a cleaning station comprising an enclosure/housing wherein the cleaning is provided by an automation solution.

For example, in one or more aspects of the present disclosure, the cleaning operation may be provided at an automatized cleaning station by means of one or more cleaning liquids and/or by using one or more cleaning devices such as brushes and/or fabric materials.

In one or more aspects of the present disclosure, said method may provide a laminated vacuum insulated glass (VIG) unit according to any of claims 1-19.

The present disclosure moreover, in a further aspect, relate to a method of providing a laminated vacuum insulated glass unit, wherein said method comprises the steps of:
  providing a vacuum insulated glass unit comprising first and second glass sheets separated by support structures to provide a gap between the glass sheets, and an edge-sealing enclosing and sealing said gap, wherein said first glass sheet comprises an evacuation hole, and wherein a sealing system seals the evacuation hole,
  providing an enclosure device comprising one or more walls, and placing said enclosure device at said first glass sheet so that it encloses said sealing system,
  providing a cleaning operation of the outer major surface of the first glass sheet,
  providing a lamination layer and a further sheet,
  placing said lamination layer so that the lamination layer covers said cleaned outer major surface of the first glass sheet, and
placing a further sheet so that the lamination layer is placed between the further sheet and the first glass sheet of the VIG unit, and so that said enclosure device extends into a hole in the further sheet.

After the VIG unit has been produced and before the lamination sheet and further sheet is provided and placed so that the lamination sheet is arranged between the outer major surface of the first glass sheet, and the further sheet, it may be advantageous to clean the outer major surface of the first glass sheet in order to avoid that contaminants such as dust, dirt, fat residues and/or other unwanted contaminants are trapped between the outer major surface of the first glass sheet and the lamination layer. Such contaminants may e.g. be undesired in that they may ruin or reduce the view through the laminated VIG unit, and/or provide aesthetic drawbacks that may cause a discarding of the laminated VIG unit.

However, a sufficient cleaning of the outer major surface of the first glass sheet may comprise the need using a liquid and/or pressurized gas in order to provide a sufficient and fast cleaning of the surface, for example in a cleaning station where cleaning liquid, such as heated liquid, deionized water and/or the like is used, e.g. in combination with cleaning members such as brushes, fabric materials or the like forced over the glass sheet surface to clean it. Also a drying step may here be provided in aspects of the present disclosure.

Such cleaning operations may however damage or risk damaging the sealing system and/or the area around the evacuation holes either during the cleaning or after the cleaning at a later point in the lifetime of the laminated VIG unit.

For example, test results have indicated that micro cracks may occur in the glass sheet, such as a tempered glass sheet near the evacuation hole during or after the evacuation of the gap, and the enclosure device may also help to protect such cracks.

Generally, as previously described, the enclosure device comprising the one or more walls, such as a ring wall and e.g. also a top wall enclosing and protecting the sealing system and a part of the area around the evacuation opening/hole may however protect these parts during the cleaning operation and reduce the risk of damaging the VIG unit at or near the evacuation hole. For example it may reduce the risk of the cleaning operation damages the sealing system and/or reduce the risk of liquid applied during the cleaning gets near or into micro cracks in the first glass sheet, or into openings at or near the sealing system.

Additionally, the enclosure device may help to provide a protection of the sealing system and the area near the evacuation hole when the lamination layer/sheet or sheets is/are placed and when the further sheet, such as a glass sheet is placed.

In one or more aspects of the method according to the further aspect, a recessed portion in the outer major surface of the first glass sheet may enclose said evacuation hole, and said enclosure device may be placed so that it extends into said recessed portion in the first glass sheet. See e.g. above or below in the present disclosure. The enclosure device may however in further aspects of the present disclosure be placed on the outer major surface of the first glass sheet at a non-recessed portion of this glass sheet enclosing said evacuation hole.

In one or more aspects of the method according to the further aspect, said method may comprises heating said lamination layer so as to soften said lamination layer to bond the lamination layer to the first glass sheet of the VIG unit and to said further sheet.

In one or more aspects of the method according to the further aspect, said method may comprise attaching said enclosure device to a surface such as a recessed surface of said first glass sheet, by means of an adhesive. This may e.g. help to provide an improved protection during e.g. said cleaning, heating and/or the like, as it may prevent the enclosure device from being unintentionally moved.

In one or more aspects of the method according to the further aspect, said method may comprise placing a cover, such as a cap or plate, to cover said hole of the further sheet, so as to cover said sealing system and enclosure device, wherein the cover is attached to one or more parts of the VIG unit lamination assembly. It is generally understood that this attachment may be provided prior to e.g. a heating of the lamination layer, or after this heating.

In one or more aspects of the method according to the further aspect, said method may comprise that the cover is attached to the further sheet of the laminated VIG unit, such as by means of an adhesive and/or a friction force.

In one or more aspects of the method according to the further aspect, said method may comprise attaching said cover to the enclosure device, such as by means of an adhesive.

This may provide an improved sealing and protection during the cleaning and provide an improved fixation of the enclosure device.

This may e.g. comprise that an adhesive is placed around the evacuation hole and/or at a connection surface and/or other surfaces of the enclosure device. The enclosure device is placed to enclose the sealing system so that the adhesive bond the enclosure device to the glass sheet. In one or more aspects of the present disclosure, the adhesive material may be left to cure, e.g. in a time frame between 10 minutes and five hours, such as between 1 hour and four hours, e.g. between 2½ hours and 3½ hours, such as around 3 hours before the cleaning process is initiated.

In one or more aspects of the method according to the further aspect, said method may comprise placing said cover in a recessed portion in the outer surface of the further sheet.

In one or more aspects of the method according to the further aspect, said method may comprise arranging said lamination layer so that the enclosure device extends through a cut-out in the lamination layer.

In a still further aspect, the present disclosure relates to a laminated vacuum insulated glass (VIG) unit comprising
- a vacuum insulated glass unit comprising first and second glass sheets separated by support structures to provide a gap between the glass sheets, and an edge-sealing enclosing and sealing said gap,
- an evacuation hole extending to the gap and arranged in said first glass sheet,
- a sealing system sealing the evacuation hole, and
- a lamination layer arranged between a further sheet and the first glass sheet comprising said evacuation hole,
- wherein an enclosure device comprising one or more walls is arranged at said first glass sheet so that it encloses said sealing system and extends into a hole in the further sheet,
- wherein said enclosure device comprises a top wall extending over the top of the sealing system so as to cover the top of the sealing system, and
- wherein a cover covers said sealing system and enclosure device.

The enclosure device may generally provide a protection of the sealing system and area around the evacuation opening/hole from outer forces during the lamination process, such as during a cleaning process to clean the outer major surface of the first glass sheet, it may provide a protection during the lamination process where the lamination layer is provided and the further sheet is provided, it may provide a protection during a heating process where the lamination layer is heated to soften and provide a bonding, and/or the like. It may also provide a protection of the sealing system and an area around the evacuation opening from the lamination layer material when it is heated to soften.

The cover may help to provide a desired visual appearance at the area of the evacuation hole and hole in the further sheet after the lamination process and when the laminated VIG unit is installed, e.g. at a building as part of a building aperture cover, and may moreover provide an enhanced protection at the area of the evacuation hole and sealing system.

Additionally, generally, laminating the major surface of the VIG unit comprising the evacuation opening and sealing system instead of the opposite surface of the VIG unit may provide an overall thinner laminated VIG unit and/or provide a VIG unit with improved protection of the area at and near the evacuation opening and sealing system. For example, the further sheet may provide a protection as it prevents the sealing system from extending through a plane defined by a major outer surface of the laminated VIG unit, or reduces how much it may extend through this plane.

Generally, said enclosure device may comprises a ring wall from which the top wall extend to cover the sealing portion. The ring wall may be circular, it may be polygonal shaped such as shaped as a rectangle, a pentagon, hexagon, heptagon octagon and/or the like. This ring wall portion may extend to the opening in the further sheet from the recessed surface in the first sheet.

In one or more aspects of said still further aspect, said enclosure device may be attached to a surface of said first glass sheet by means of an adhesive, such as to a surface of a recessed portion enclosing the evacuation hole.

This may e.g. provide that the enclosure device may withstand larger mechanical forces from e.g. the cleaning process, the lamination layer, and/or the further sheet when these are conducted or placed prior to the lamination process, without being at least partly moved/displaced in the recessed portion of the first glass sheet.

It may also provide a substantially sealed connection so that fluid such as a cleaning liquid cannot get to the sealing system and/or the area near the evacuation opening.

The adhesive may e.g. comprise a silicone material and/or an acrylic adhesive, it may comprise a PVB layer o EVA layer and/or the like.

The enclosure device may in further aspects of said still further aspect be placed on at the outer major surface of the first glass sheet at a non-recessed portion of this glass sheet to enclose said evacuation hole.

In one or more aspects of said still further aspect, said enclosure device may comprise a connection flange providing a connection surface connected to a surface of said further sheet, such as by means of an adhesive.

This may e.g. help to provide a larger surface to be attached to the surface of the recced portion by means of an adhesive, in aspects where an adhesive is used for attaching the enclosure device to the glass sheet.

The flange may also or alternatively help to centre the enclosure device in a recessed portion if the enclosure device is placed in a recessed portion according to aspects of the present disclosure.

It is understood that in one or more aspects of the present disclosure, the height of said enclosure device may be larger than the height of said sealing system, at least after the sealing system has been sealed to seal said gap. This may e.g. help to provide an improved protection of the sealing system. However, if the enclosure device is e.g. open at the top, the height of the enclosure device may in one or more aspects of the present disclosure be smaller than the height of said sealing system.

In one or more aspects of said still further aspect, said top surface of the enclosure device is arranged to be below or in the level of a plane defined by the outer major surface of the further sheet.

This may e.g. provide a more space saving enclosure solution and/or may help to provide a desirable aesthetic appearance. It may also help to reduce the risk that outer forces, after the lamination process may act on the enclosure device and thus provide a laminated VIG unit with improved resistance to outer forces without damaging the reduced pressure in the gap between the VIG unit glass sheets.

In one or more aspects of said still further aspect, said enclosure device may extend into a recessed portion in the first glass sheet enclosing the evacuation hole.

In one or more aspects of said still further aspect, said recessed portion may have a width less than 20 mm, such as less than 12 mm, e.g. less than 10 mm, such as less than 7 mm.

This may help to provide a desired aesthetic appearance of the laminated VIG unit as a small area for the enclosure device may be is provided and e.g. so that a cover member for providing a cover for the sealing system and enclosure device may be smaller, in aspects of the present disclosure where such a cover device is used.

In one or more aspects of said still further aspect, the depth of said recessed portion may be at least 0.5 mm such as at least 0.8 mm e.g. at least 1.0 mm.

This may in one or more aspects of the present disclosure be measured between a surface of the recessed portion in connection with the enclosure device and the major outer major surface of the first glass sheet.

In one or more embodiments of the present disclosure, the recessed surface may be recessed more than 20% such as 30%, e.g. more than 40% of the average thickness of the first glass sheet. For example, the recessed surface may be recessed between 20% and 60% such as between 35% and 55% of the average thickness of the glass sheet.

In one or more aspects of the present disclosure, the said sealing system and a part of said enclosure device may extend through a cut-out in the lamination layer.

In one or more embodiments of the present disclosure, instead of a part of said sealing system and a part of said enclosure device extending into a cut-out in the lamination layer, said lamination layer may cover said sealing system and said enclosure device.

In one or more aspects of said still further aspect, said cover may be fixed to one or more parts of the laminated VIG unit and cover said sealing system and enclosure device.

The cover may provide an improved visual/aesthetic appearance of the laminated VIG unit as it may at least partly or fully visually cover the recessed portion, sealing system and enclosure device, so as to prevent or reduce the view to the sealing system and enclosure device when looking at the outer surface of the further sheet of the laminated VIG unit.

The cover, such as a cover member, may e.g. in one or more aspects comprise a metal layer, a painted layer, a glass layer with changes in a refractive index different than the refractive index different of the further glass sheet and/or the like, and/or it may comprise a cover member such as a cap or plate.

The cover may also in further aspects of the present disclosure substantially completely cover said hole in the further sheet.

In one or more aspects of said still further aspect, the above mentioned cover may be cover member such as a cap or plate attached to said further sheet such as by means of an adhesive and/or a friction force.

This may e.g. provide an easy and fast mounting of the cover. This may e.g. be obtained by means of an adhesive such as a glue, adhesive tape and/or the like. In one or more other aspects, the cover may be attached by means of mechanical fasteners such as a latch/notch system, a thread, a spring member, by means of friction and/or a socket system.

If the cover is a cover member such as a cap or plate, the cover member may e.g. be made e.g. from a metal, a glass material and/or a polymer material, such as a plate made from one or more of these materials, and may adhere to the further sheet and/or the enclosure device by means of an adhesive layer and/or one or more mechanical fasteners.

In one or more aspects, the cap or plate may provide a protection against mechanical forces, and thus have a structural strength given by the cover member material itself, e.g. in combination with the attachment solution such as adhesive and/or a mechanical arrangement attaching the cover member to the laminated VIG unit.

In one or more aspects of the present disclosure, the cover member may have a circular or oval shape, it may be polygonal shaped such as shaped as a rectangle, a pentagon, hexagon, heptagon, octagon, it may be oval and/or the like.

In one or more aspects of said still further aspect, said cover may be recessed in the outer major surface of said further sheet.

This may e.g. help to protect the cover from mechanical forces in the final laminated VIG unit, it may help to provide that the cover may provide a desired aesthetic appearance by reducing the extent of the cover above the outer major surface of the further sheet while at the same time being able to use a cover made from a material and/or having a thickness providing an improved structural strength and/or the like.

In one or more aspects of said still further aspect, a bonding, such as an adhesive bonding, is provided between the enclosure device and a surface of said cover facing the VIG unit, such as a bonding between the top surface of said top wall of the enclosure device and a surface of said cover.

This may e.g. help to provide an improved attachment of the cover and/or a long lasting solution where the cover remains in the desired position. This may e.g. be advantageous as the laminated VIG unit may be used for many years, and exposed to various conditions such as UV light, mechanical forces due to weather and/or objects striking the laminated VIG unit.

Bonding the cover to the enclosure device may also provide an increased bonding surface for the cap providing that the dimensions of the cover, such as the width/diameter of the cover may be reduced as e.g. a surface for attaching the cover to the further sheet by e.g. an adhesive may be reduced.

The bonding between the cover and enclosure device may e.g. be provided by means of the lamination layer when heating and softening the lamination layer, it may be provided by means of an adhesive material placed between the cover and the enclosure device to bond to these, it may be provided by means of a mechanical connection and/or the like.

In one or more aspects of said still further aspect, said sealing system may comprise an evacuation tube and a sealing portion providing a seal between the evacuation tube and the first glass sheet comprising said recessed portion.

Such sealing systems may e.g. be advantageous to use for sealing an evacuation hole in a glass sheet of a VIG unit, but a part of this type of sealing system may extent from the surface of the VIG unit and here be vulnerable during e.g. lamination. The evacuation tube may e.g. have been sealed by melting the free end of the tube or by a mechanical compression of the wall of the tube after an evacuation of the gap.

In one or more aspects of said still further aspect, said enclosure device and said evacuation tube of said sealing system supports on and/or connects to the same recessed surface of the recessed portion in the first glass sheet.

This may e.g. provide a more simple solution seen from a manufacturing perspective, and/or a more space saving solution as a part of the sealing system is thus recessed.

In one or more aspects of said still further aspect, said recessed portion comprises a first recessed surface and a second recessed surface, wherein the second recessed surface is arranged closer to said gap than the first recessed surface, wherein said enclosure device connects with said first recessed surface and/or wherein a sealing portion of said sealing system at least partly cover said second recessed surface.

This may e.g. provide an advantageous control of the placement of the enclosure device and/or control of the sealing system during manufacturing of the VIG unit and/or laminated VIG unit.

In one or more aspects of the present disclosure, said recessed portion in the first glass sheet may comprise an inclined guiding surface inclining in a direction towards a bottom surface of said recessed portion. This inclined surface may help to align the enclosure device at the desired position when placing the enclosure device to support at a surface in the recessed portion.

The first and second recessed surfaces may in one or more aspects be concentric surfaces, e.g. circular concentric surfaces, and or surfaces extending in parallel planes. In one or more aspects of the present disclosure, a part of the sealing system, such as an evacuation tube may support on/connect to the second recessed surface.

In one or more aspects of said still further aspect, said glass sheets of the VIG unit may be tempered glass sheets such as thermally tempered glass sheets.

Such tempered glass sheets provides an improved strength of the VIG unit, and may e.g. provide that the support structures may be placed with a larger mutual distance in the gap of the VIG unit, such as above 30 mm, e.g. above 40 mm, such as above 50 mm between proximate/neighbouring support structures.

In one or more aspects of said still further aspect, said hole in the further sheet may be a through hole.

The through hole may e.g. be advantageous from a manufacturing perspective as it may be easy to manufacture.

In other aspects of the present disclosure, the hole in the further sheet may be a blind hole, which e.g. may provide a desired aesthetic appearance, such as provide an unbroken outer major surface of the further sheet. If a blind hole is used, it is understood that in further aspects, an adhesive or another material may be placed between the inner surface of the blind hole facing the VIG unit, and the enclosure device, and may attach to the enclosure device such as at a top surface/wall of the enclosure device, and attach to e.g. an inner surface of the blind hole, thereby e.g. helping to provide an improved mechanical strength in the region of the blind hole.

In one or more aspects of said still further aspect, the material of said lamination layer bonds to said enclosure device, such as to the outer surface of a ring wall and/or to the top wall of said enclosure device.

In one or more aspects of said still further aspect, wherein said laminated vacuum insulted glass (VIG) unit may be is provided/manufactured by means of a method according to any of claims 20-39.

Additionally, the present disclosure relates to a building aperture cover, such as a window, e.g. a roof window, or a door for covering a building aperture, wherein said building aperture cover comprises a laminated vacuum insulated glass unit arranged in a frame, wherein said laminated vacuum insulated glass unit is a laminated vacuum insulated glass unit according to any of claims 1-19 and/or any of claims 40-55, and/or said laminated vacuum insulated glass (VIG) unit may have been obtained by means of the method according to any of claims 20-39.

Moreover, the present disclosure relates to a laminated vacuum insulted glass unit obtained by means of the method of any of claims 20-39.

It is generally understood that the cover in one or more aspects of the present disclosure, where it is recessed, may be either fully recessed so the outwardly facing and exposed surface of the cover is in or below a plane defined by the major outer surface of the further glass sheet, or it may extend at least partly above the outer major outer surface of the further glass sheet and be partly recessed.

It is generally understood that that one or more effects, advantages and/or aspects described above in relation to for example the first aspect and/or aspects thereof may apply for one or more aspects described in relation to the above disclosed further aspects and vice versa.

FIGURES

Figure 2:
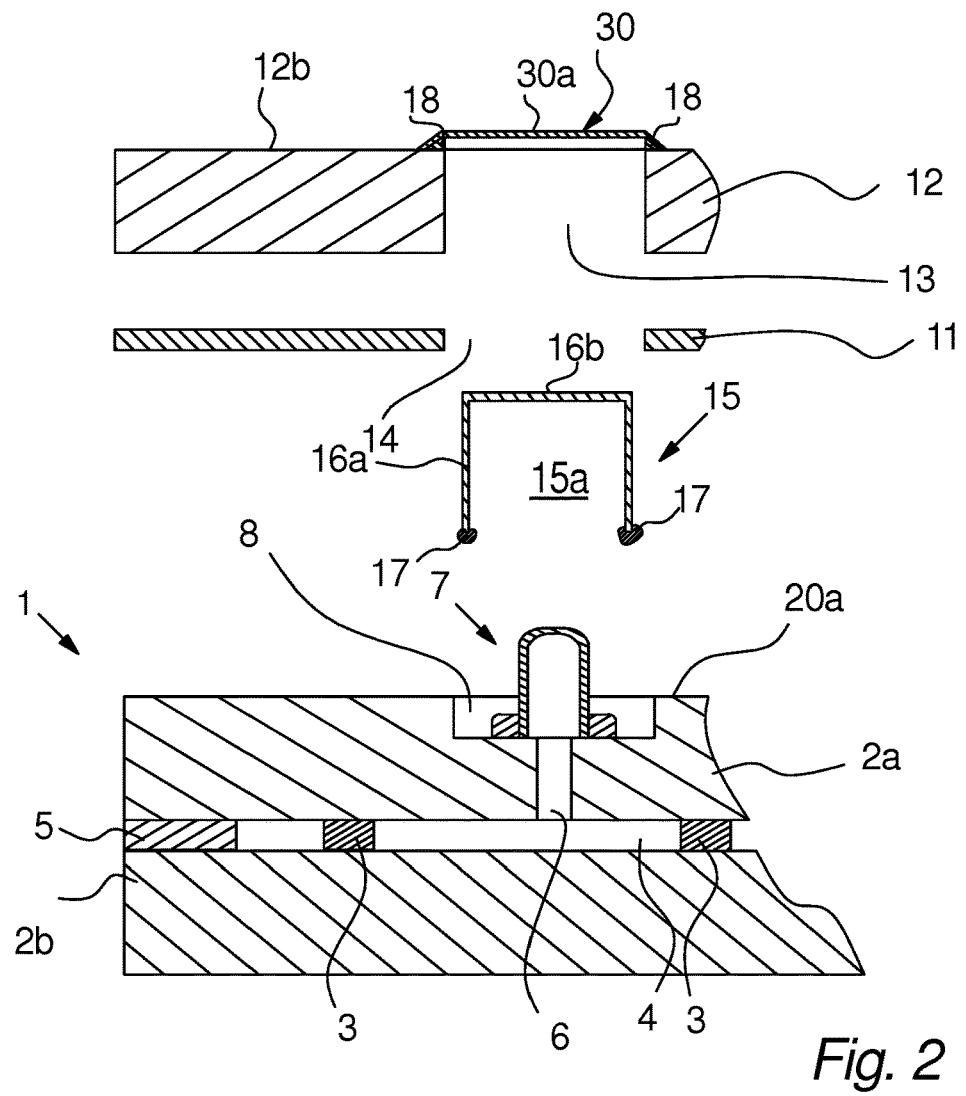
Figure 3:
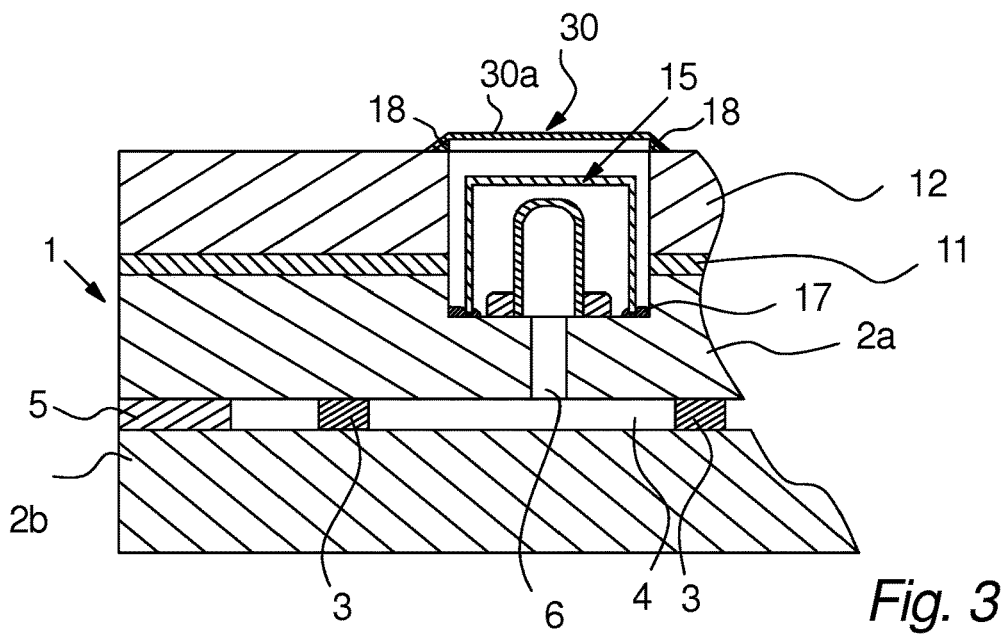

Aspects of the present disclosure will be described in the following with reference to the figures in which:

FIG. 1: illustrates a laminated vacuum insulated glass unit according to embodiments of the present disclosure, FIGS. 2-3: illustrates a lamination of a vacuum insulated glass unit according to embodiments of the present disclosure.

Figure 4:
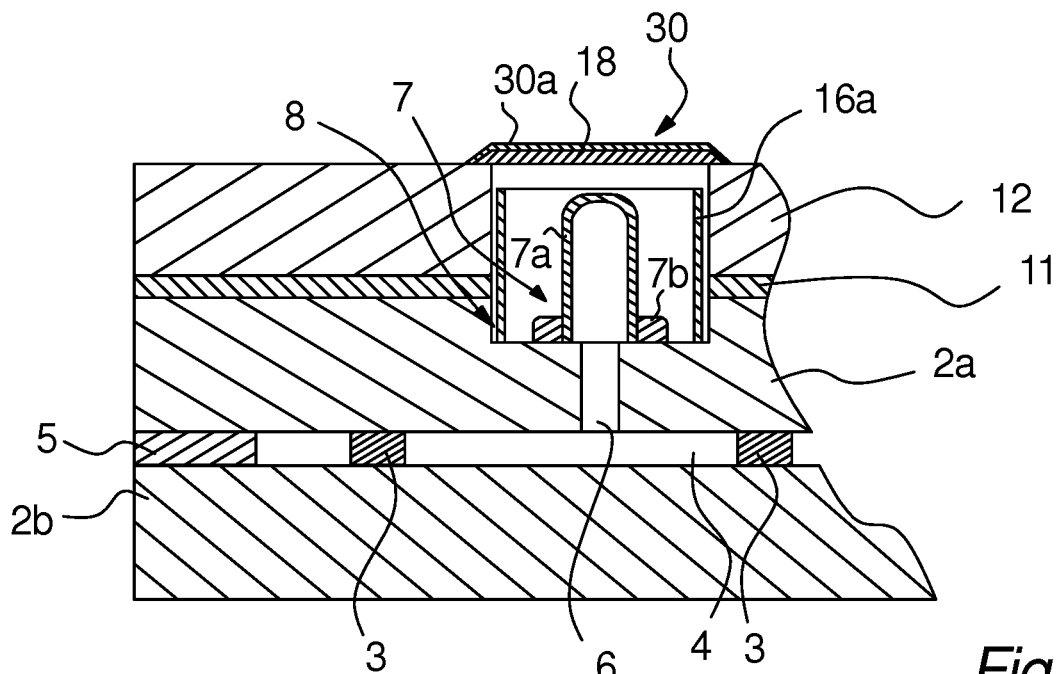
Figure 5:
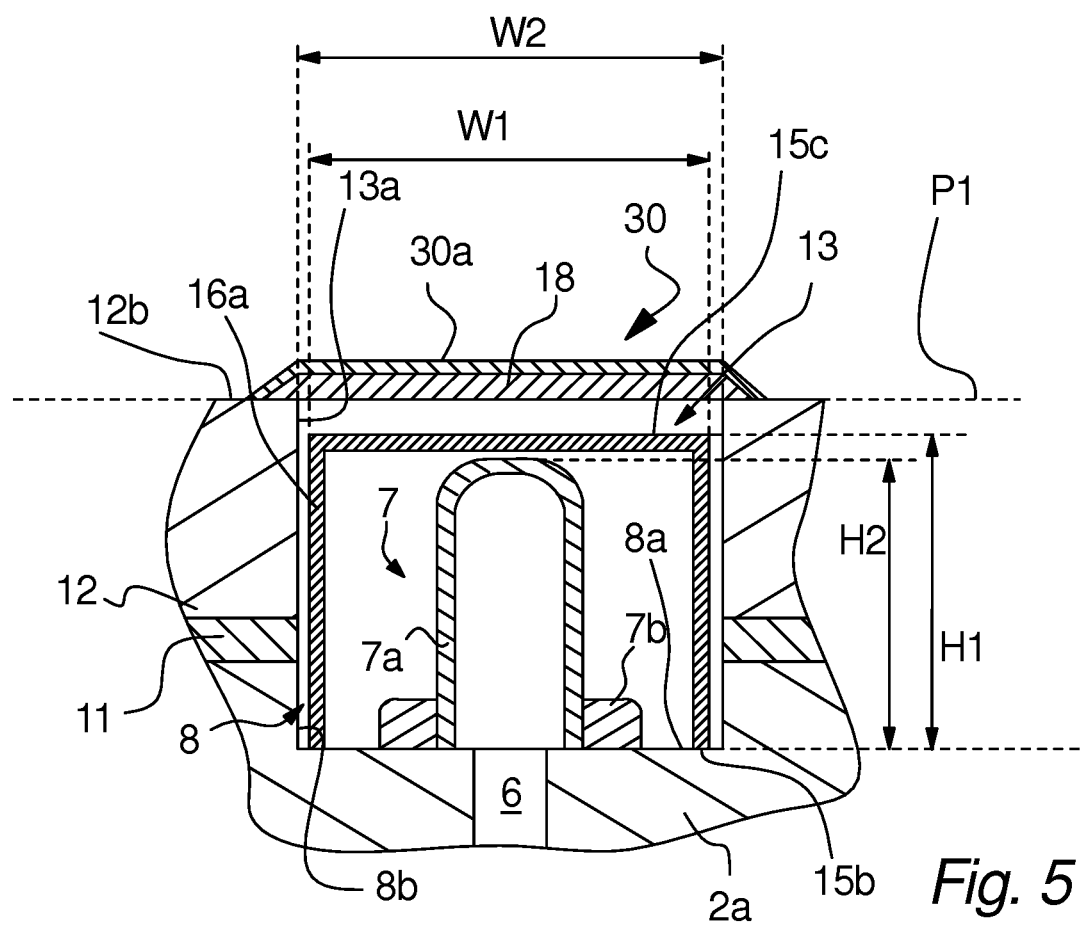
Figure 6:
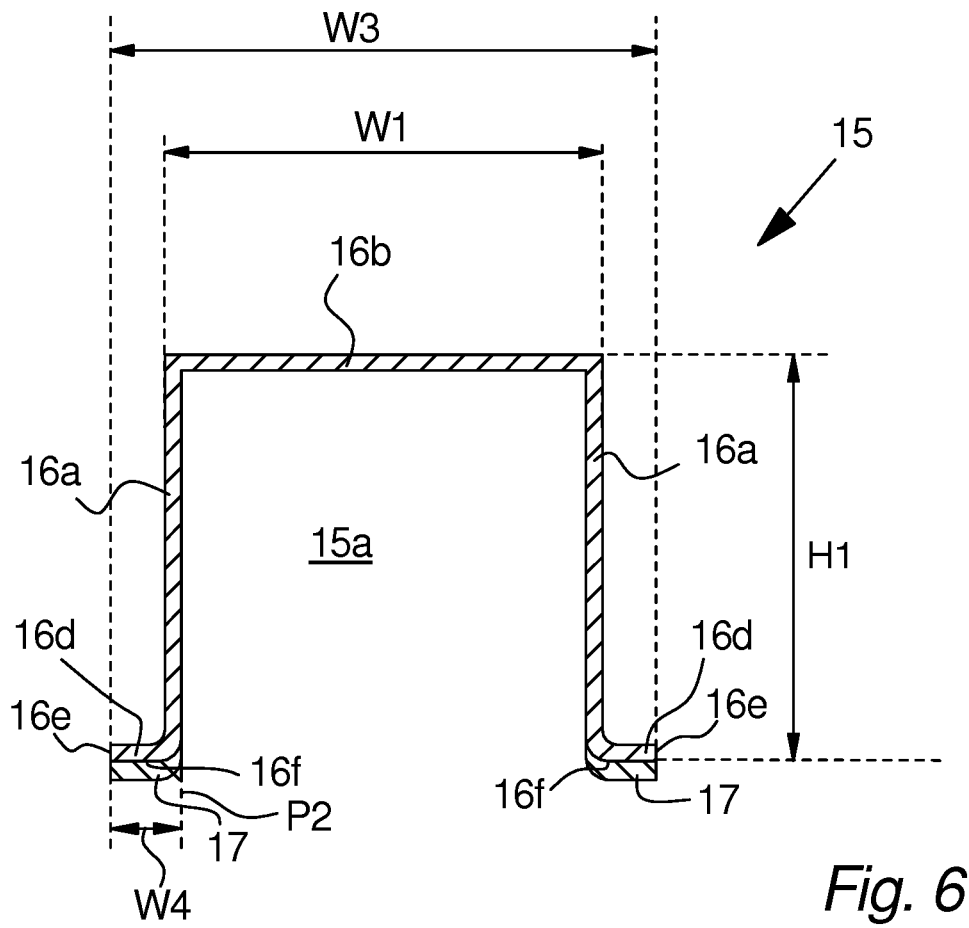
Figure 7:
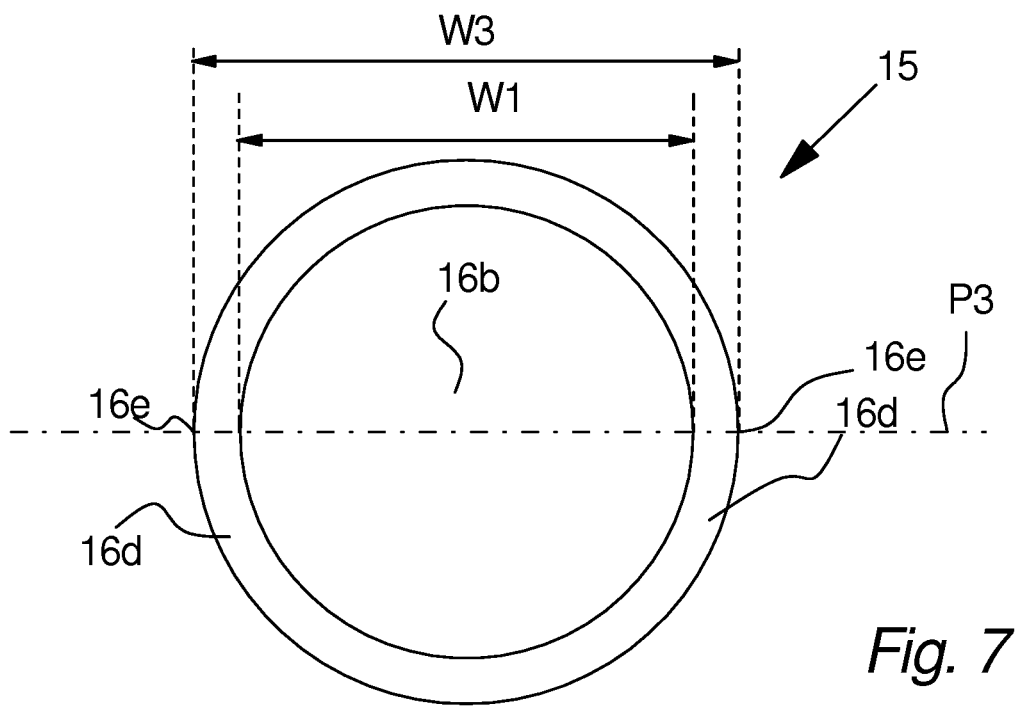
Figure 8:
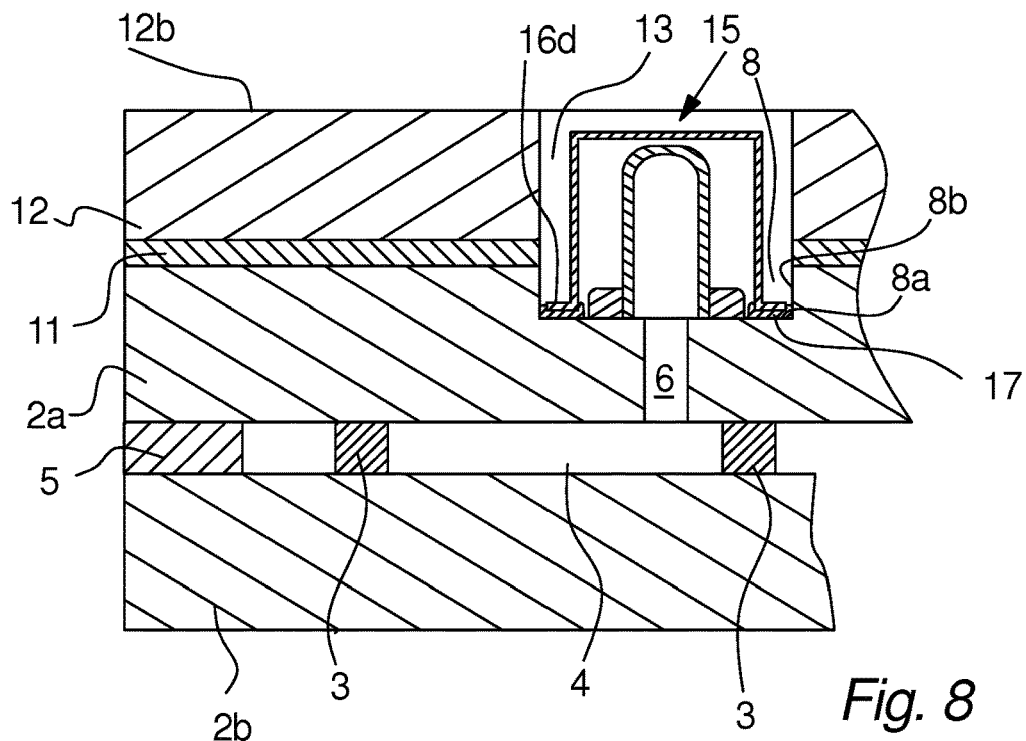
Figure 9:
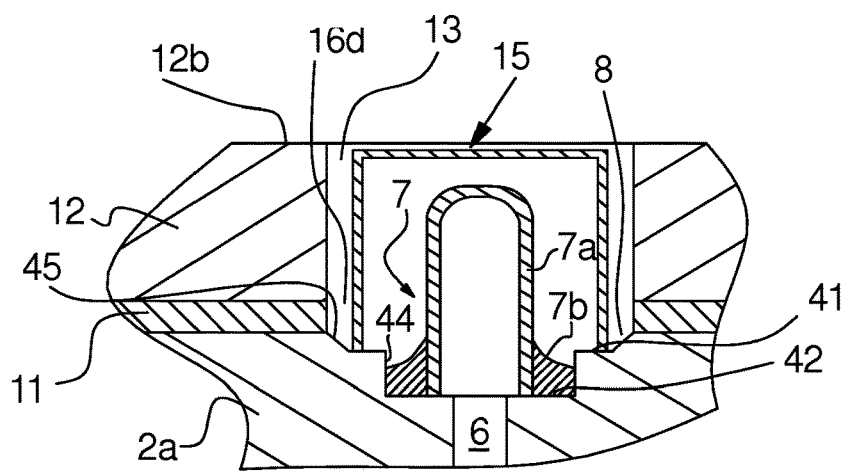
Figure 10:
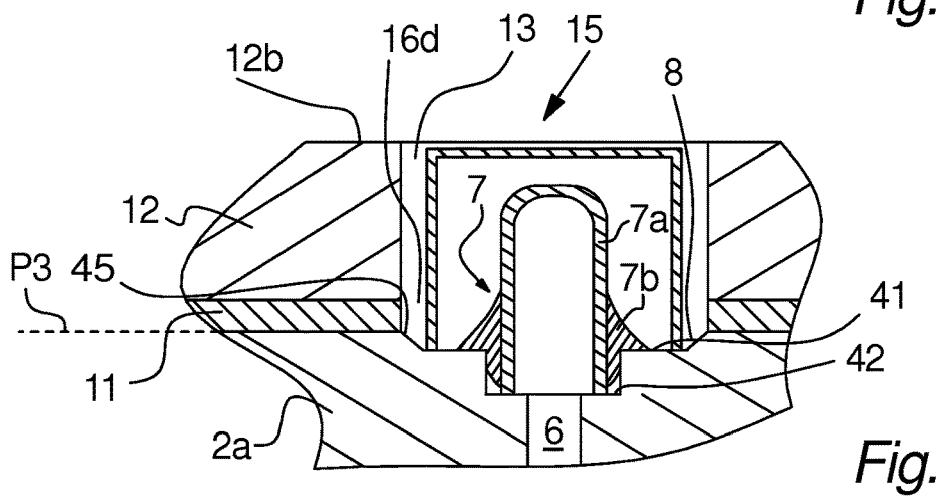
Figure 11:
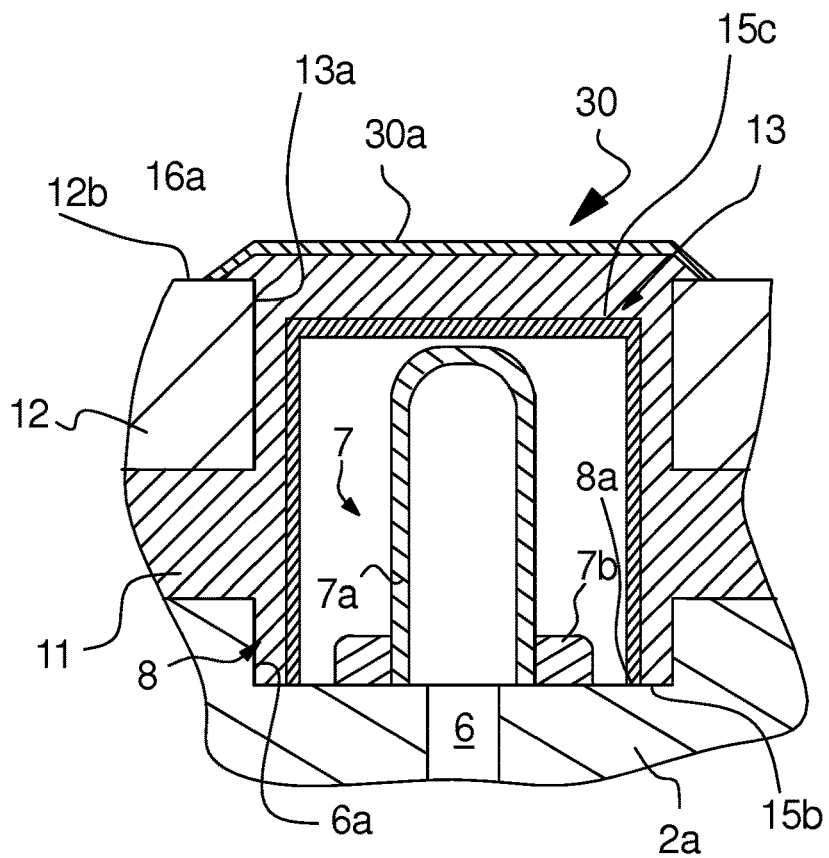
Figure 12:
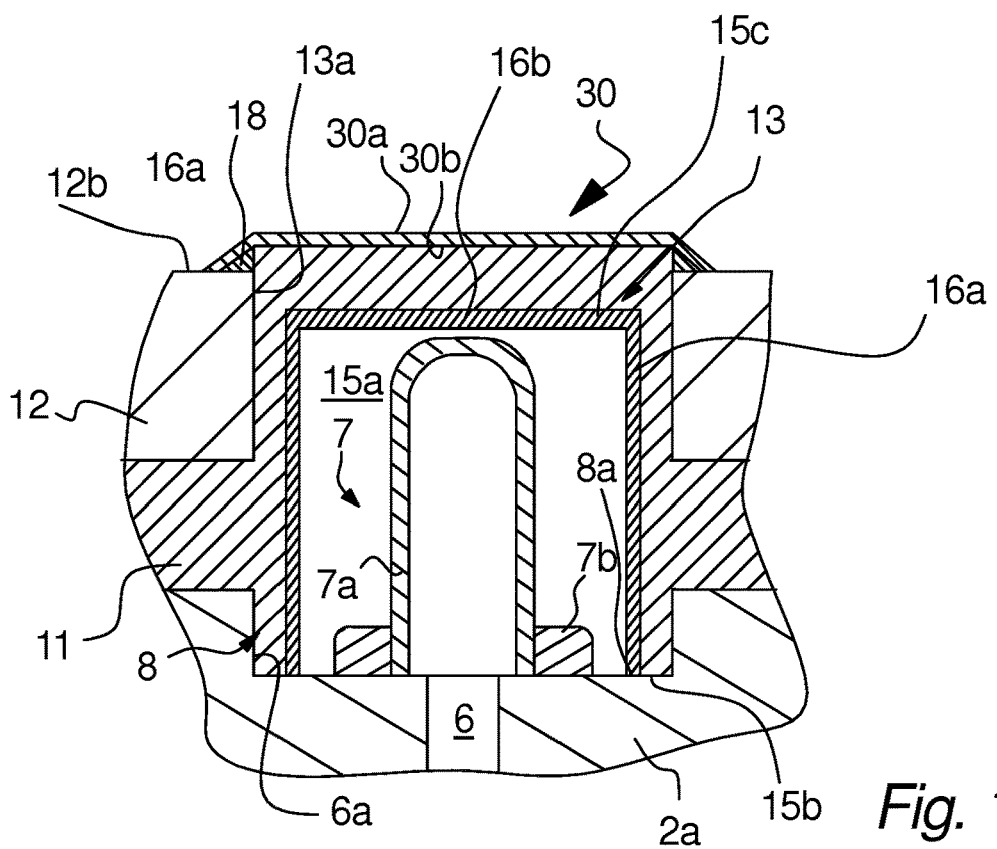
Figure 13:
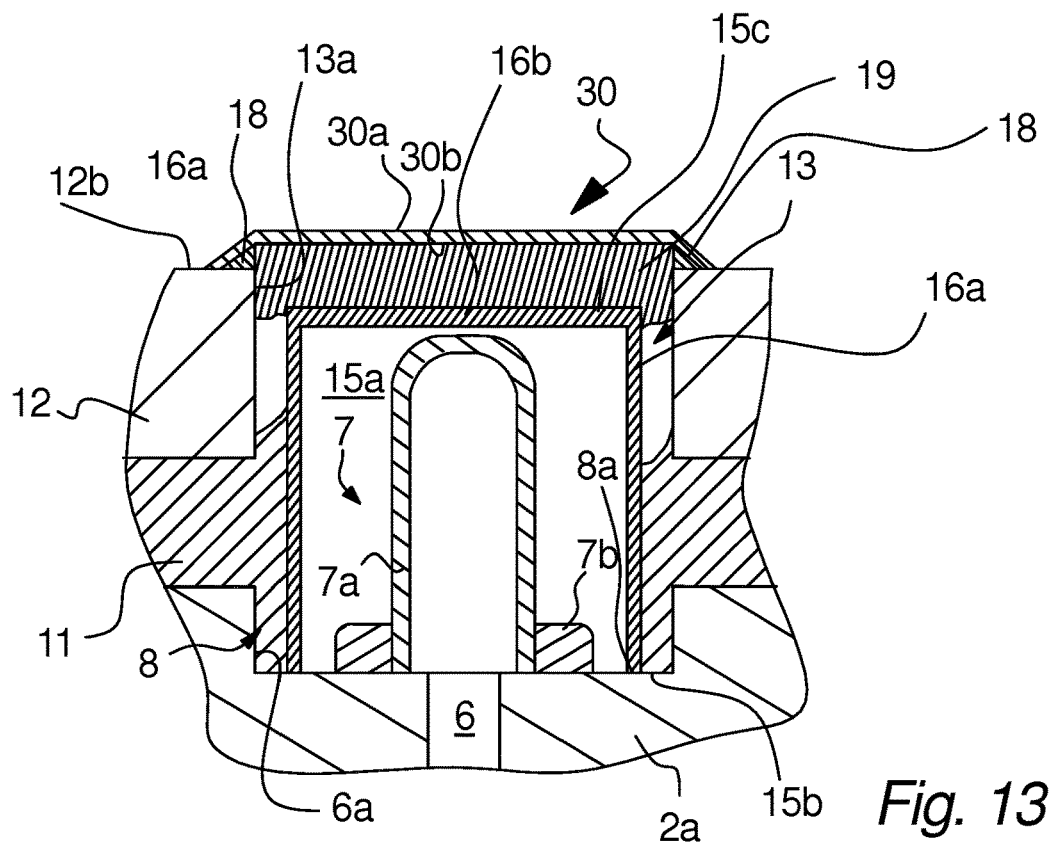
Figure 14:
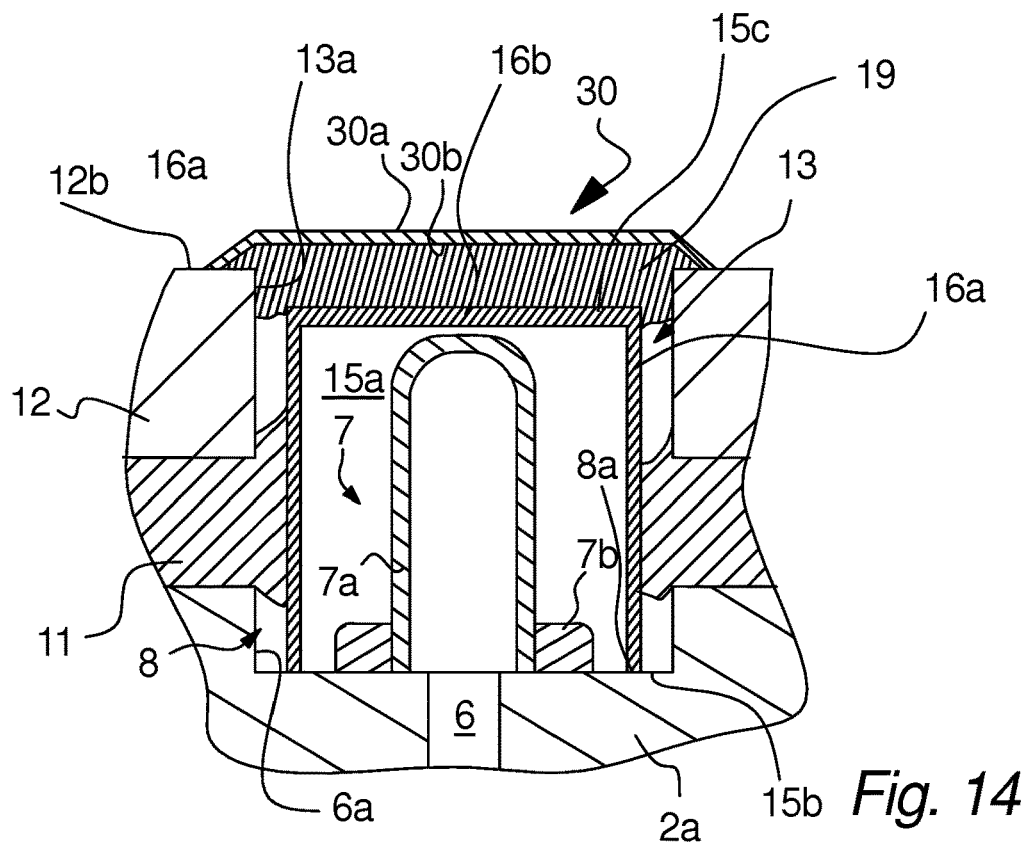
Figure 15A:
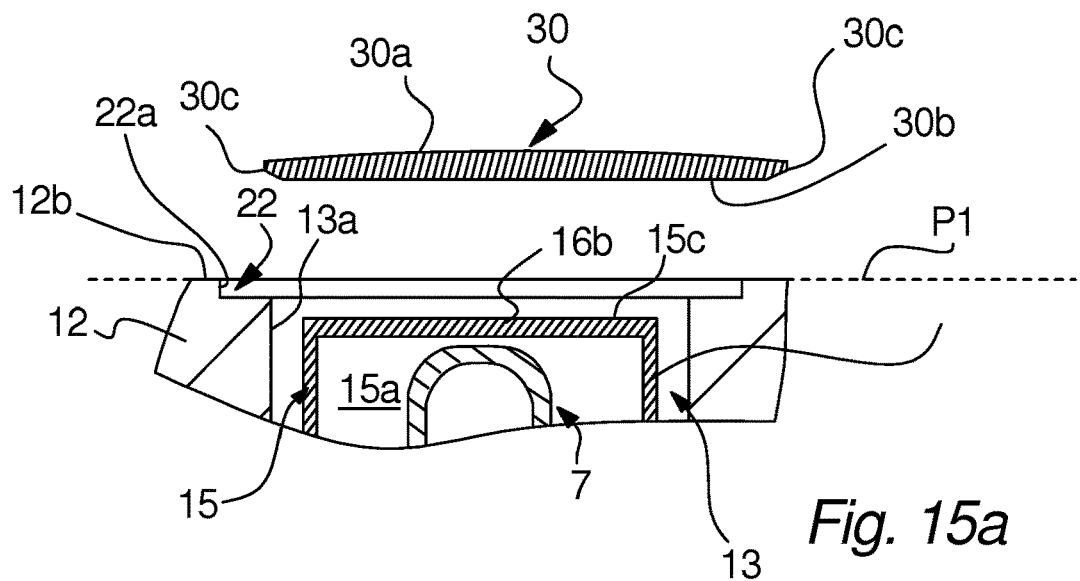
Figure 15B:
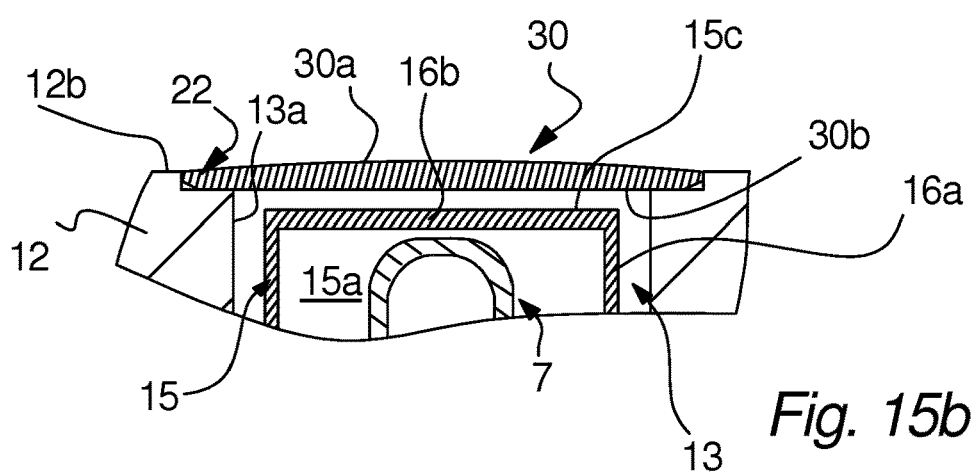
Figure 16:
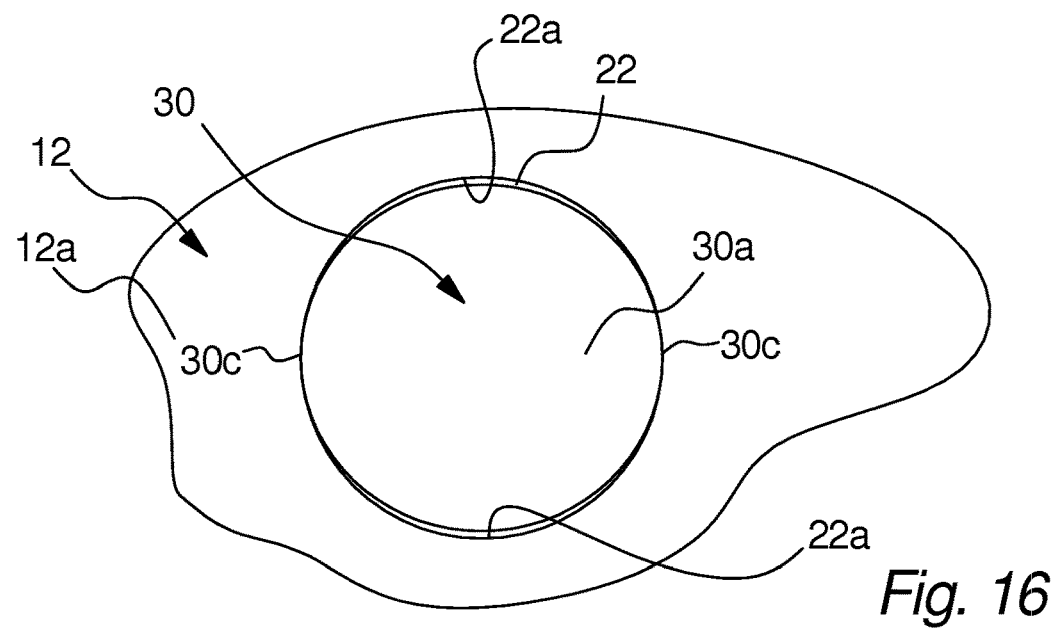
Figure 17:
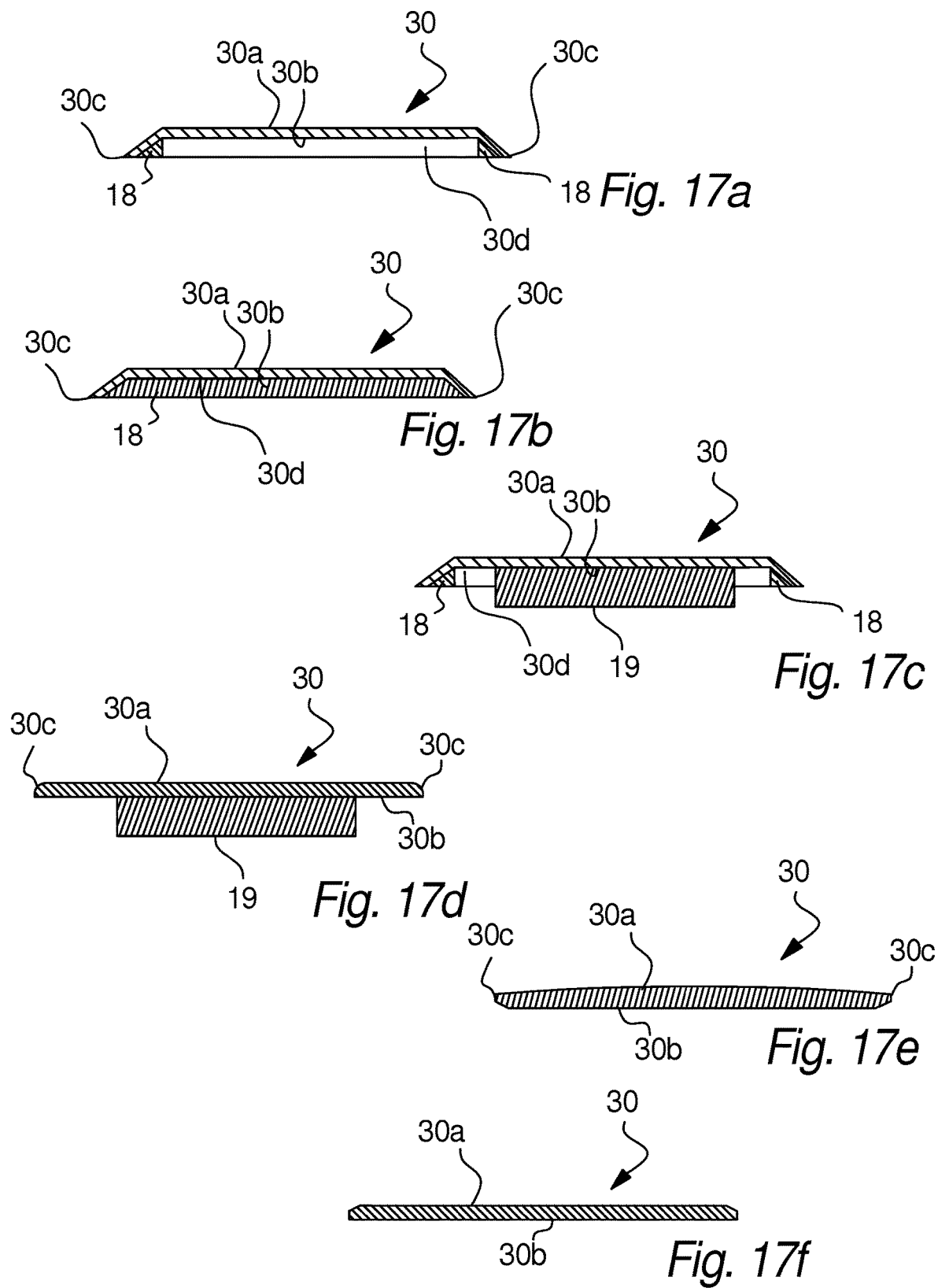
Figure 18:
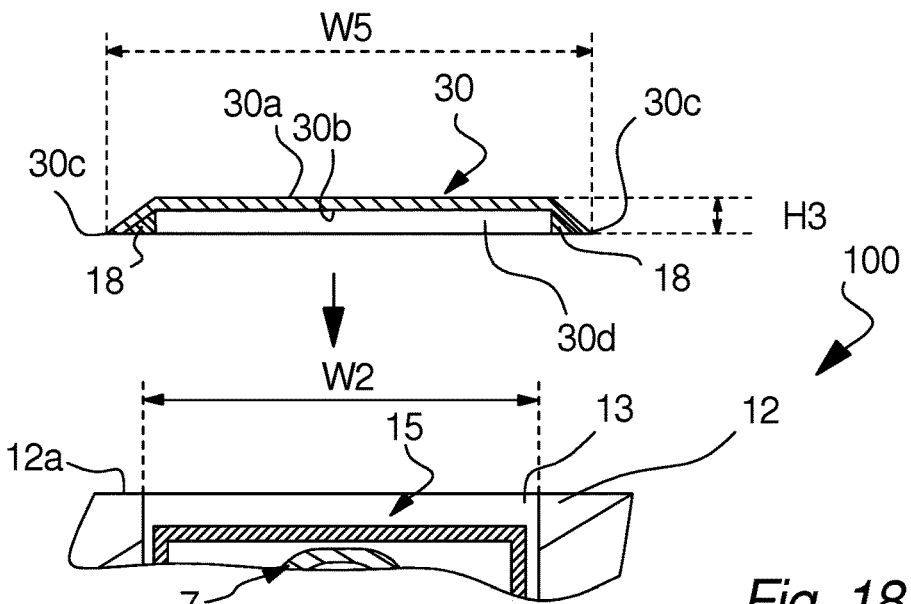
Figure 19:
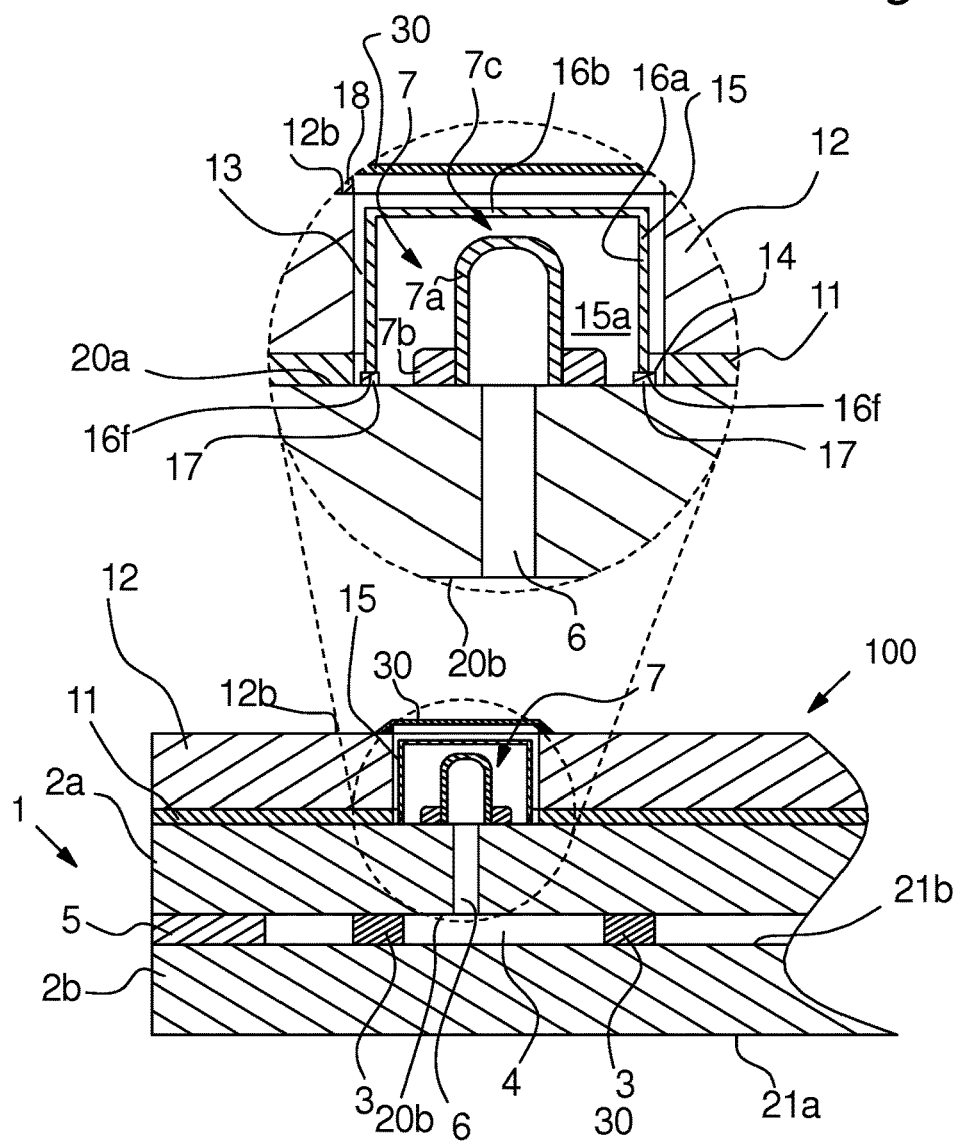
Figure 20:
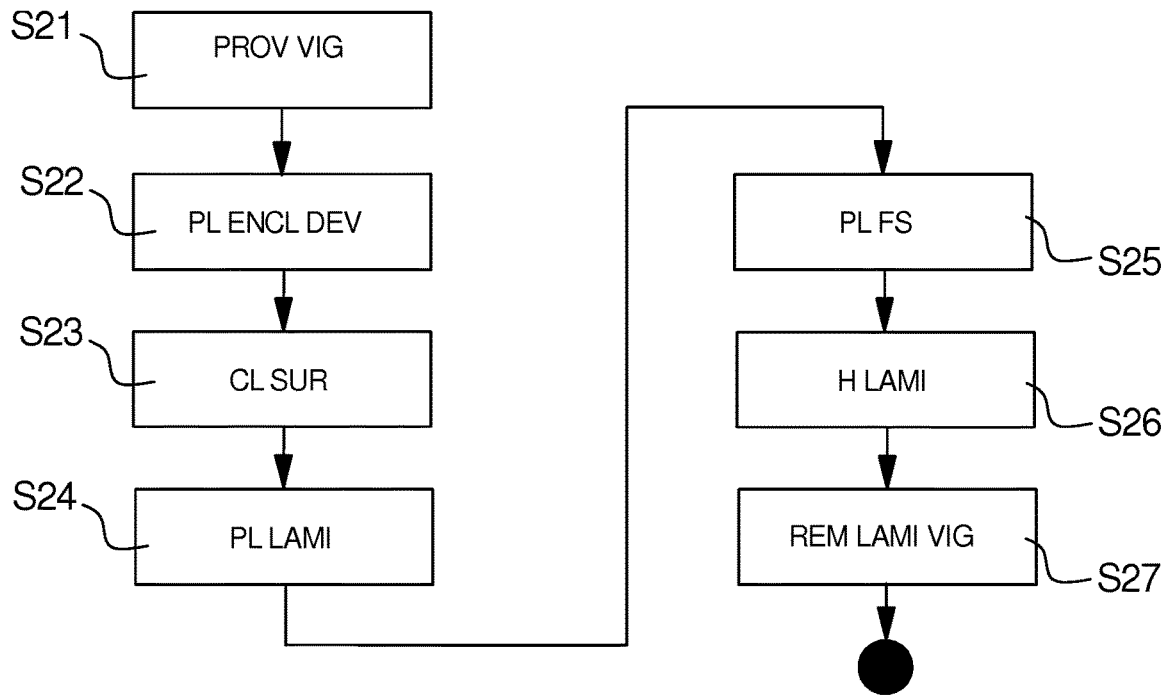
Figure 21:
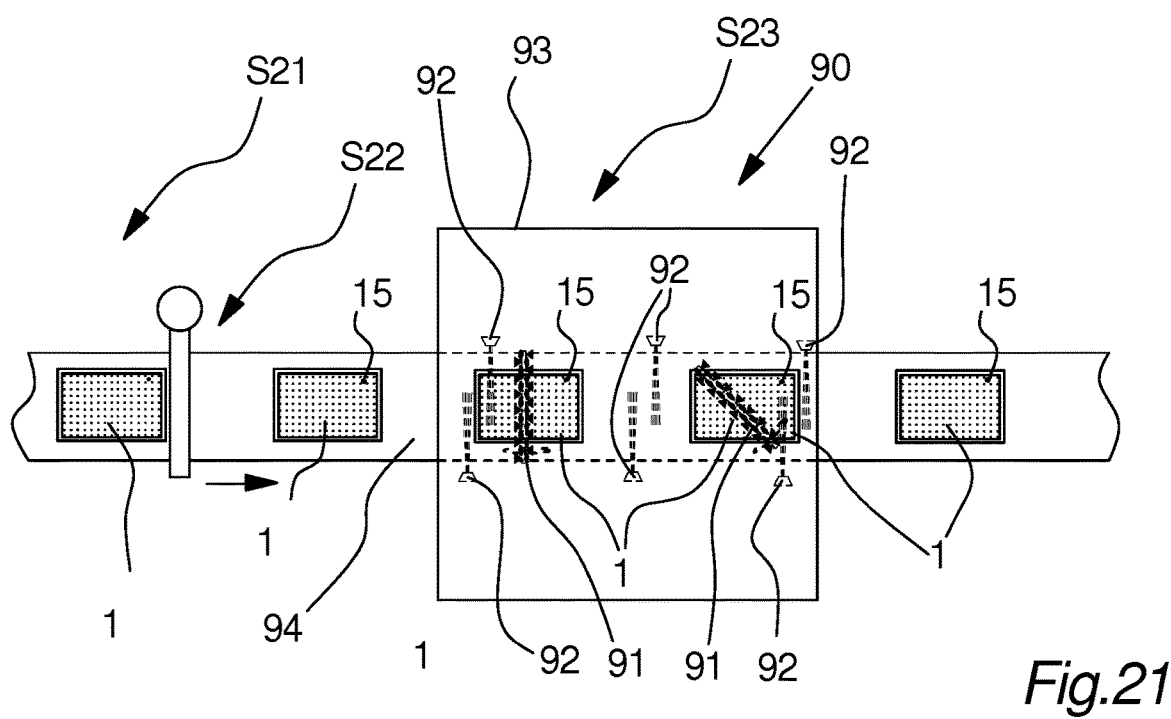
Figure 22:
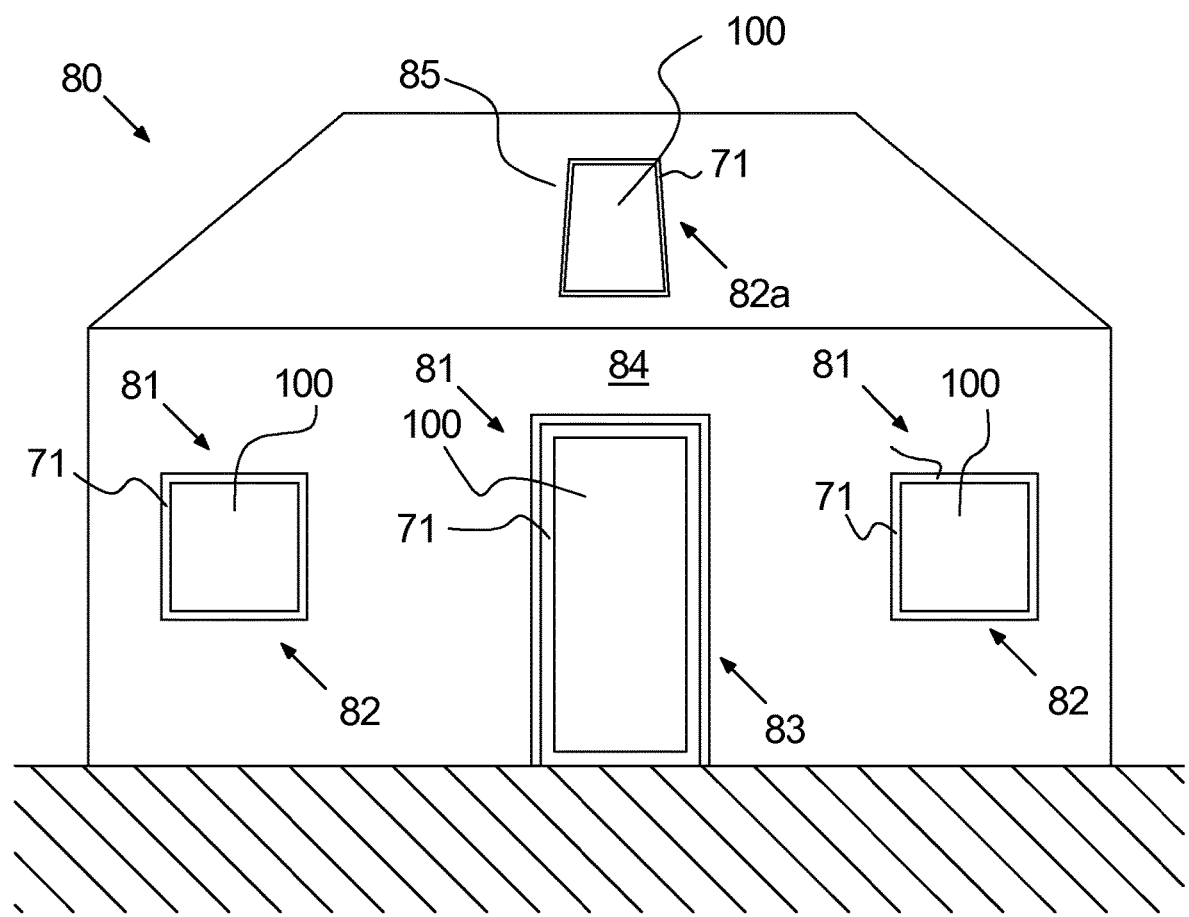
Figure 23:
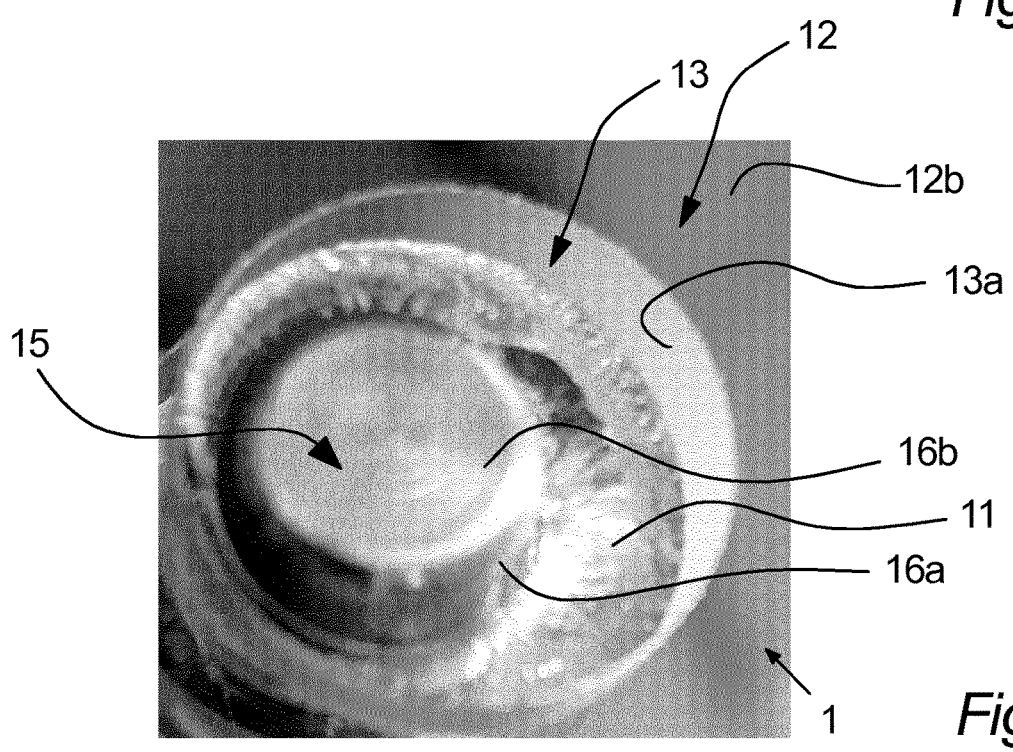

FIG. 4: illustrates an embodiment of the present disclosure where an enclosure device is open at the top, FIG. 5: illustrates a laminated vacuum insulated glass unit according to further embodiments of the present disclosure, FIGS. 6-8: illustrates an enclosure device according to various embodiments of the present disclosure, comprising a flange portion, FIGS. 9-10: illustrates that a recessed portion in a VIG unit surface may comprise first and second recessed surfaces, according to various embodiments of the present disclosure, FIGS. 11-12: illustrates embodiments of the present disclosure, where a cover member bond/attach to an enclosure device, FIGS. 13-14: illustrates embodiments of the present disclosure, where a cover member bond/attach to an enclosure device by means of a layer/material part separate to a lamination layer, FIGS. 15a-15b: illustrates embodiments of the present disclosure where a cover member is placed in a recessed portion in a surface of a further sheet, FIG. 16: illustrates that a cover member is be held in a fixed position in a recess by means of a friction force/connection, according to embodiments of the present disclosure FIGS. 17a-17f: illustrates a cover member according to various embodiments of the present disclosure, FIG. 18: illustrates a cover member having a width/diameter that is larger than the width/diameter between opposing the inner walls of a hole in a further sheet according to various embodiments of the present disclosure, FIG. 19: illustrates an enclosure device that is not arranged in a recessed portion, according to one or more embodiments of the present disclosure, FIG. 20: illustrates a flowchart according to one or more embodiments of the present disclosure, FIG. 21: illustrates a cleaning process according to one or more embodiments of the present disclosure, and FIG. 22: illustrates a building comprising building aperture coverings, according to one or more aspects of the present disclosure, and FIG. 23: is an image/photo of a test sample of a laminated VIG unit provided according to embodiments of the present disclosure.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a cross sectional view of a laminated vacuum insulated glass (VIG) unit 100 according to one or more embodiments of the present disclosure.

The VIG unit 1 comprises a first glass sheet 2a and a second glass sheet 2b separated by support structures 3 to provide and maintain a gap 4 between the glass sheets 2a, 2b, and an edge-sealing 5 enclosing and sealing said gap 4. The support structures may 3 e.g. comprise a plurality of distributed pillars made from a metal material, a ceramic material, a glass material and/or the like.

The edge sealing 5 may in one or more embodiments of the present disclosure comprise a glass material such as a low melting temperature solder glass material, it may comprise a metal sealing material and/or the like.

The edge sealing 5 may e.g. in one or more embodiments of the present disclosure comprise a low melting point solder glass material that softens and melts at a temperature below 450° C., such as below 420° C., and may e.g. be vanadium based so as to reduce the amount of or even avoid lead in the edge sealing. In other embodiments, the melting temperature of the edge sealing may however be higher.

The glass sheets 2a, 2b of the VIG unit 1 may in one or more embodiments of the present disclosure be tempered glass sheets such as thermally tempered glass sheets.

The first glass sheet 2a comprises an outer major surface 20a facing the lamination layer 11, and an inner major surface 20b facing the gap 4. Also, the second glass sheet 2b comprises a major surface 21a facing away from the gap 4 and a major surface 21b facing the gap 4.

An evacuation hole 6 is arranged in the first glass sheet 2a and extend to the gap 4 to provide a fluid communication between the gap 4 and the exterior of the VIG unit until the gap 4 is sealed. The evacuation hole 6 has been used during evacuation of the gap 4 so as to reduce the pressure in the gap 4 before the gap 4 is sealed, e.g. by means of an evacuation cup or an evacuation chamber connected to an evacuation pump for evacuating a space in the evacuation cup or evacuation chamber, thus evacuating the gap between the VIG unit glass sheets.

In one or more embodiments of the present disclosure, the pressure in the gap may be below $10^{-3}$ bar, e.g. below $10^{-5}$ bar, such as below $10^{-6}$ bar after evacuation and sealing of the evacuation hole 6.

A recessed portion 8 in the outer surface 20a of the first glass sheet 2a encloses said evacuation hole 6, and a sealing system 7 arranged in the recessed portion 8 seals the evacuation hole 6. The recessed portion 8 may e.g. be circular, polygonal and/or oval shaped in one or more embodiments of the present disclosure.

A lamination layer 11 is arranged between a further sheet 12 and the first glass sheet 2a comprising the evacuation hole/opening 6 enclosed in the recessed portion 8. In one or more embodiments of the present disclosure, the lamination layer may comprise one or more layers of PVB (Polyvinyl butyral) material, EVA (Ethylene Vinyl Acetate) material and/or the like.

The thickness of the lamination layer 11 may in one or more embodiments of the present disclosure be between 0.5 and 2 mm such as between 0.8 and 1.5 mm, e.g. between 1.2 and 1.6 mm such as around 1.4 mm before and/or after it is heated to soften and thus bond to the further sheet 12 and the first glass sheet 2a of the VIG unit.

The further sheet 12 may for example be a glass sheet made from tempered glass such as thermally tempered glass or a glass sheet made from annealed glass.

A part of the sealing system 7 extends into a hole 13 in the further sheet 12 so that the hole 13 in the further sheet encloses a part of the sealing system 7.

In the present example, the sealing system 7 comprises an evacuation tube 7a such as a glass evacuation tube or a metal evacuation tube, and a sealing portion 7b providing a seal between the evacuation tube 7a and the first glass sheet 2a comprising said recessed portion 8. The sealing portion 7b may in one or more embodiments of the present disclosure comprise solder glass material, it may comprise a metal seal material such as solder metal seal and/or the like. This seal 7b may e.g. have been heated prior to and/or during the evacuation of the gap 4 in order to make the sealing portion 7b melt/soften and thus bond to the tube 7a and the first glass sheet to obtain an air-tight sealing.

When the evacuation of the gap 4 has been provided sufficiently through the evacuation hole 6, the sealing of the gap 8 after the evacuation has been provided by sealing the evacuation hole by means of the sealing system, e.g. by heating a part of the tube 7a to a point where it melts and flows together, by mechanically compressing a part of the tube such as compressing a metal tube to close an opening of the tube and/or the like.

It is however understood that in further embodiments of the present disclosure, the sealing system 7 may comprise the sealing portion 7b, but the evacuation tube may be omitted, and the sealing may be provided by heating the sealing portion 7b until it flows in over and covers the evacuation hole 6 to seal it, and is then subsequently cooled.

An enclosure device 15 comprising one or more walls 16a, 16b encloses at least a part of said sealing system 7 and extends into said hole 13 in the further sheet 12 and into said recessed portion 8 in the first glass sheet 2a of the VIG unit 1.

In one or more embodiments of the present disclosure, the enclosure device 15 may be made from a metal such as steel, e.g. stainless steel, but it may also e.g. be made from another material, e.g. a glass material, a polymer material, a ceramic material and/or a combination of one or more of these materials.

The enclosure device 15 may e.g. be manufactured by means of a 3D printing process, it may be manufactured by a mouldering process to manufacture the enclosure device 15, it may be manufactured by press forming, milling and/or the like.

In one or more embodiments of the present disclosure, said enclosure device 15 comprises a ring wall portion 16a, such as a circular ring wall portion, a polygonal shaped wall portion such as a rectangle, a pentagon, hexagon, heptagon, octagon and/or the like shaped wall portion.

The ring wall portion 16a encloses a receiving space/hollow 15a for receiving a part of the sealing system 7 so as to protect the sealing system during the lamination process.

The enclosure device 15 may moreover, in one or more embodiments of the present disclosure, comprise a top wall portion 16b extending in over the exposed top 7c sealing system 7 so as to cover the top 7c of sealing system 7 distant to the surface of the recessed portion 8 of the glass sheet 2a. In one or more embodiments of the present disclosure, the enclosure device 15 may thus be considered as an enclosure cup/cap supporting in the recessed portion 8 with the open part of the enclosure cup/cap 15 facing towards the gap 4.

The enclosure device 15 is connected to a surface 8a of the recessed portion 8, in the present example by means of an adhesive 17 such as a silicone material, an acrylic adhesive material, a PVB (Polyvinyl butyral) material, an EVA (Ethylene Vinyl Acetate) material, an adhesive tape and/or the like.

It is generally to be understood that in one or more embodiments of the present disclosure, the part of the surface 8a in the recessed portion 8 connected to the enclosure device 15, e.g. at a lower surface 16f of the enclosure device, such as an annular shaped surface, may be substantially parallel to the inner and outer surfaces 20a, 20b of the first glass sheet as illustrated, or it may be inclining with an angle, such as an angle between 3° and 25°, such as between 5° and 10° to one of these surfaces 20a, 20b (not illustrated).

The hole 13 in the further sheet 12 may in one or more embodiments of the present disclosure be a through hole as illustrated schematically in relation to FIG. 1, or it may be a blind hole (not illustrated) comprising a recessed portion facing the VIG unit to receive a part of the enclosure device 15 and a part of the sealing system 7 such as a part of the evacuation tube comprising the sealed end of the tube if an evacuation tube is present.

The depth DE1 provided by the surface of the recessed portion 8 in connection with the enclosure device 15 may in one or more embodiments of the present disclosure be arranged at least 0.5 mm such as at least 0.8 mm e.g. at least 1.0 mm below the major outer major surface 20a of the first glass sheet. For example, the recessed surface 8a may in one or more aspects of the present disclosure provide a depth DE1 measured from the outer major surface 20a between 0.5 and 1.4 mm such as between 0.7 and 1.2 mm, e.g. between 0.8 and 1.1 mm.

In one or more embodiments of the present disclosure, the recessed surface 8a may be recessed more than 20% such as 30%, e.g. more than 40% of the thickness of the first glass sheet 2a. For example, the recessed surface 8a may be recessed between 20% and 60% such as between 35% and 55% of the thickness of the glass sheet.

FIG. 2 illustrates schematically a cross sectional view of a vacuum insulated glass (VIG) unit 1 to be laminated according to one or more embodiments of the present disclosure.

In FIG. 2, a VIG unit lamination assembly is illustrated comprising the VIG unit 1, lamination layer 11, further sheet 12 and enclosure device 15, before the lamination process to heat the lamination layer and/or the like has been provided, but e.g. after a cleaning process (see more about this below in relation to e.g. FIG. 20-21) has been provided to clean the outer major surface 20a of the first glass sheet 2a.

The VIG unit 1 comprises the recessed portion 8 and the evacuation hole 6 has been sealed by the sealing system 7 prior to arranging the enclosure device 15. Before arranging the lamination sheet 11 and the further sheet 12, the enclosure device 15 is arranged in the recessed portion 8.

Subsequently, the lamination sheet and the further sheet 12 such as a glass sheet are placed.

In one or more embodiments of the present disclosure, the lamination sheet 11 may comprise a cut-out 14 opening through which the enclosure device 15 and possibly also a part of the sealing system (dependent on the sealing system 7 solution) extends. Alternatively, the lamination sheet 11 may in other embodiments of the present disclosure not comprise the cut-out 14, and may instead cover the top wall 16b of the enclosure device 15 (not illustrated).

A cover 30 may in one or more embodiments of the present disclosure be arranged to visually cover the said recessed portion 8, sealing system 7 and enclosure device 15 so that the view to the sealing system and evacuation hole 6 is hindered or significantly reduced when looking at the surface 30a of the cover 30 facing away from the gap 4.

The cover 30 may in one or more embodiments of the present disclosure comprise a cover plate/disc or cap made e.g. from metal such as aluminium or steel, a polymer material, a ceramic material, a glass material, such as a coloured or matted/frosted glass material or a glass material with a refractive index that provides a reduced view towards the evacuation opening, or the like, attached to the further sheet 12, e.g. at the outer surface 12a and/or it may be attached to said enclosure device 15 (not illustrated in FIG. 2).

The cover 30 may also in one or more embodiments of the present disclosure be applied with information such as a manufacturer logo, identification information relating to the manufacturing process and/or traceability and/or the like at the outwardly facing surface, or at a location where it can be viewed from the outside of the cover after it is placed.

The cover 30 may be produced by a milling or stamping production, it may be produced in a mould and e.g. subsequently finished and/or the like.

FIG. 3 illustrates schematically a cross sectional view of the set comprising the VIG unit 1, lamination layer 11, enclosure device 15, further sheet 12 and cover 30 of FIG. 2 after the lamination process to provide the laminated VIG unit 100.

FIG. 4 illustrates schematically a cross sectional view of an embodiment of the present disclosure where the enclosure device 15 is open at the top so that the top of the sealing system 7 is exposed when the enclosure device 15 is placed in the recessed portion 6.

The enclosure device is thus open at the end opposite the end of the enclosure device (15) that is proximate the recessed portion 8 and connects to the recessed portion.

The enclosure device 15 here comprises the ring wall portion 16a that may in the form of a small pipe piece arranged to enclose a part of the sealing system 7. The enclosure device may also comprise a flange (not illustrated) in FIG. 4), se description later on.

FIG. 5 illustrates schematically a cross sectional view of an embodiment of the present disclosure, where the enclosure device has a height H1 so that the top part of the enclosure device 15 is arranged to be below or in the level of a plane P1 defined by the outer major surface 12b of the further sheet 12.

It is generally understood that in one or more embodiments of the present disclosure, as e.g. indicated in FIGS. 1-5, the height H1 of the enclosure device 15 may in one or more embodiments of the present disclosure be larger than the height H2 of the sealing system 7, at least after the sealing system 7 has been sealed to seal said gap 4.

The diameter/width W1 of the enclosure device 15 may in one or more embodiments of the present disclosure be so that a distance between the wall 16a and the inner wall 8b of the recessed portion 8 and distance between the wall 13a of the hole 13 in the further sheet is provided, i.e. so that the width/diameter W1 is smaller than the diameter/width W2 of the recessed portion 8 and the hole 13. It is understood that even though the hole 13 and recessed portion 8 diameter/width W2 is indicated as being substantially identical in FIGS. 1-5, the width/diameter W2 of these may in further embodiments of the present disclosure be different.

In one or more embodiments of the present disclosure, the recessed portion 8 may have a width W2 less than 20 mm, such as less than 12 mm, e.g. less than 10 mm, e.g. such as less than 7 mm.

For example, in one or more embodiments of the present disclosure, the recessed portion 8 may have a width W2 between 7 mm and 15 mm such as between 8 mm and 12 mm, e.g. around 9 mm such as between 8 mm and 10 mm.

It is generally understood that in one or more embodiments of the present disclosure, the width/diameter W1 measured between the outer wall 16a surfaces of the enclosure device 15 may be between 4 mm and 15 mm, such as between 5 and 10 mm, e.g. between 6 and 8 mm, such as around 6-7 mm. In one or more embodiments of the present disclosure, the width/diameter W1 measured between the outer wall 16a surfaces of the enclosure device 15 may be less than 15 mm such as less than 10 mm, e.g. less than 7 mm.

It is generally understood that in one or more embodiments of the present disclosure, the height H1 of the enclosure device may be less than 10 mm, such as less than 7 mm e.g. less than 6 mm, such as less than 5 mm.

It is generally understood that in one or more embodiments of the present disclosure, the height H1 of the enclosure device 15 may be between 4 mm and 10 mm, such as between 5 mm and 7 mm e.g. between 5 mm and 6 mm.

It is generally understood that the supporting/contacting edge 15b may be attached to the surface 8a of the recessed portion by means of an adhesive 17 (not illustrated in FIG. 5) in one or more embodiments.

The height H1 may be measured between the supporting/contacting edge 15b proximate the surface 8a of the recessed portion connected to or supporting the enclosure device (either including or not including adhesive layer 17—not illustrated in FIG. 5) and the top 15c surface of the top wall 16b of the enclosure device 15.

The wall 16a thickness of the enclosure device may in one or more embodiments of the present disclosure be between 0.2 mm and 1 mm, such as between 0.4 mm and 0.6 mm, e.g. around 0.5 mm.

FIGS. 6 and 7 illustrates schematically an enclosure device 15 according to embodiments of the present disclosure, where the enclosure device 15 comprises a connection flange 16d for providing a connection between the enclosure device 15 and a surface of the recessed portion 8. FIG. 6 illustrates a cross sectional view through plane P3 illustrated in FIG. 7, and FIG. 7 illustrates the enclosure device 15 seen from above.

The connection flange 16d may be provided by means of an annular ring or the like that is provided by bending and stretching a part of the wall 16a, it may be provided by attaching the a part of the flange 16d to the wall 16a by welding or soldering, it may be provided by 3D printing, e.g. in the event that the enclosure device is manufactured by 3D printing, it may be provided by a mouldering process to manufacture the enclosure device and/or the like.

The overall width/diameter W3 of the enclosure device 15 measured between end outer, free edges 16e of the flange 16d may in one or more embodiments of the present disclosure be less than 15 mm, such as less than 11 mm, e.g. less than 10 mm, such as less than 9 mm.

For example, the overall width/diameter W3 of the enclosure device 15 measured between end outer, free edges 16e of the flange 16d may in one or more embodiments of the present disclosure be between 5 mm and 15 mm, such as between 6 mm and 10 mm, e.g. between 7 mm and 9 mm or between 8 mm and 9 mm.

The width W4 of the flange measured from an end edge 16e of the flange 16d to a plane P2 defined by the inner surface of the wall 16a facing the hollow/space 15a may in one or more embodiments of the present disclosure be between 0.8 mm and 3 mm, such as between 1 mm and 1.8 mm, e.g. around 1.3-1.5 mm. An adhesive layer 17 attached to the supporting/contacting surface of the flange 15 is illustrated in FIG. 6, but it is understood that the adhesive 17 in further aspects of the present disclosure may be omitted.

The free edges/the outer rim 16e may of the flange defines the overall max width W3 of the enclosure device, so that W3 is larger than width W1 defined by the outer surface of the ring wall 16a.

The overall width W3 is less than the width/diameter of the recessed portion 8 in the VIG glass sheet (not illustrated in FIG. 6 or 7, see e.g. FIGS. 8 and/or 5) so that the flange 16d can get in contact with a surface of the recessed portion 8 in the first sheet 2a of the VIG unit, see FIG. 8. It is however understood that the width of the hole 13 in the further sheet 12 may be smaller than the width of the recessed portion 8 of the first glass sheet 2a of the VIG unit (not illustrated) (but not smaller than the width W1 defined by the ring wall 16a) in one or more embodiments of the present disclosure. For example, the recessed portion 8 in the VIG unit glass sheet may in one or more embodiments have a width that is larger than the width W3, and the width of the hole in the further sheet 12 may have a width that is larger than W1, but e.g. smaller than W3.

In one or more embodiments of the present disclosure, e.g. as illustrated in one or more of FIGS. 1-8, the enclosure device 15 and a tube 7a of said sealing system may support on/connects to the same recessed surface 8a of the recessed portion 9.

As illustrated in FIGS. 3 and 8, the adhesive 17 may generally, in one or more embodiments of the present disclosure e.g. bond to the recessed surface 8a and moreover, in further embodiments bond to a part of the inner wall part 8b of the recessed portion 8 extending between the surface 20a and the recessed surface 8a. For example, a silicone adhesive 17 may be pressed up against this wall 8b when the enclosure device is pressed towards the recessed surface 8a, and thus bond both to the recessed surface and a part of the recess wall 8b.

The placing of the enclosure device may e.g. comprise that the adhesive 17 is placed around the evacuation hole and/or at a connection surface and/or other surfaces of the enclosure device, see e.g. FIGS. 6 and 2. The enclosure device 15 is then placed to enclose the sealing system so that the adhesive bond the enclosure device to the glass sheet by a sealing, adhesive connection. In one or more aspects of the present disclosure, the adhesive material may be left to cure, e.g. in a time frame between 10 minutes and five hours, such as between 1 hour and four hours, e.g. between 2½ hours and 3½ hours, such as around 3 hours before e.g. a cleaning process to clean the surface 20a is initiated, and/or before placing the lamination layer 11 and the further sheet 12, see e.g. above or below.

FIGS. 9 and 10 illustrates schematically a cross sectional view according to one or more embodiments of the present disclosure wherein the recessed portion 8 in the first glass sheet 2a of the VIG unit comprises a first recessed surface 41 and a second recessed surface 42, wherein the second recessed surface 42 is arranged closer to the gap 4 than the first recessed surface, and wherein the enclosure device 15 connects with the first recessed surface 41. At least a part of the sealing system 7 is arranged in the space provided by the second recessed portion/surface 42.

In FIG. 9, the tube 7a is arranged in the part provided by the second recessed surface so that the inner walls 44 contains/encloses a part of the sealing material 7b and the sealing system 7 comprises an evacuation tube 7a that support on/connects to the second recessed surface 42 of the recessed portion 8.

In FIG. 10, the evacuation tube 7a is placed to support on the second recessed surface 42, and the sealing material 7b is arranged to support at the first surface 41 (also connected to the enclosure device 15). The sealing material may flow at least partly into the space between wall 44 and the tube 7a, e.g. as illustrated.

The recesses provided by the support surfaces 41, 42 may e.g. provide concentric recesses and support surfaces 41, 42 of the recessed portion 8.

As can be seen in FIGS. 9-10, the recessed portion 8 may in one or more embodiments of the present disclosure comprise an inclining surface 45 that may help to centre the enclosure device in the recessed portion 8 when placing the enclosure device 15. The inclined guiding surface 45 inclines in a direction towards a bottom surface of said recessed portion (8) so that if the VIG unit is arranged so that the first glass sheet 2a faces upwards and is arranged horizontally, the inclining surface will guide the enclosure device towards a lower part of the recessed portion 8 closer to the gap 4 due to gravity.

It is understood that this inclining surface may also be provided in embodiments of the present disclosure where the recessed portion merely comprises one recessed surface as e.g. illustrated in one or more of FIGS. 1-5 and/or FIG. 8.

The inclining surface may e.g. in one or more embodiments incline between 20° and 60° compared to the plane P3 defined by the outer major surface of the first glass sheet.

It is additionally understood that in further embodiments of the present disclosure, the inclining surface 45 may be omitted, and the wall provided between the outer major surface 20a of the first sheet 2a and the surface of the recessed portion 8 connected to the enclosure device may be substantially perpendicular on the plane P3 defined by the outer major surface of the first glass sheet 2a, e.g. as illustrated in e.g. one or more of FIGS. 1-8.

FIGS. 11-12 illustrates schematically one or more embodiments of the present disclosure wherein the lamination material 11 during heating has softened and flown into the holes 13 to abut and connect to the enclosure device 15.

In FIG. 11, the material 11 also flow into a space between the cover 30 and the top 16b of the enclosure device 15, so that the lamination material 11 adhere to the outer cap 30.

In one or more embodiments of the present disclosure, a piece of lamination material such as PVB or EVA may be placed on/above the enclosure device between the cover 30, and may subsequently be heated to melt adhere to the cover 30 and the enclosure device 15.

It is generally understood that prior to and/or during the heating of the lamination layer, an evacuation step so as to remove gas bobbles/remains between the lamination layer and VIG unit and/or between the further sheet and the lamination layer may be provided in one or more embodiments of the present disclosure. This may be provided by a vacuum bag arranged to enclose the VIG unit, lamination layer and further sheet, by means of a vacuum chamber and/or the like where a suction pump is used.

FIG. 12 illustrates schematically a cross sectional view of one or more embodiments of the present disclosure wherein the cover member 30 is attached to an outer surface 12b of the further sheet 12 by an adhesive 18, and moreover is attached to the enclosure member 15. In the present example, the lamination material 11 flows in and at least partly fill out the space between the enclosure device and the cover member 30 during the lamination process, thus providing a further bonding between the inner surface cover 30 and the inner surface of the cover 30 facing the hole 13 and enclosure device 15.

Also, I one or more embodiments of the present disclosure, the material of the lamination layer 11 may as illustrated in FIGS. 11 and 12 flow into the recessed portion 8 and or the hole 13 and bond to the wall 16a of the enclosure device 15. This may also be provided in embodiments of the present disclosure where the material 11 not necessarily extends between the cover surface 30b and enclosure device's 15 top.

FIG. 13 illustrates schematically a cross sectional view of one or more embodiments of the present disclosure wherein the cover member 30 is attached to an outer surface 12b of the further sheet 12 by an adhesive 18, and moreover is attached to the enclosure member 15. Here, an adhesive material 19 such as an adhesive tape, a PVB or EVA layer to be heated and softened/melted and thus provide adhering properties, or any other type of adhesive is arranged between the cover 30 and the enclosure device 15. Accordingly, the adhesive layer/material 19 adhere to the enclosure device 15 and the inner surface 30b of the cover. The adhesive layer 19 here is separate to the adhesive 18 and to the lamination material 11, at least initially. The adhesive layer 19 may e.g. be made from the same material as the lamination layer or may be another type of adhesive.

FIG. 14 illustrates schematically a cross sectional view of one or more embodiments of the present disclosure wherein the cover member 30 is attached to a surface 12b, 13a of the further sheet 12 by an adhesive 18, and moreover is attached to the enclosure member 15. Here, an adhesive 19 such as an adhesive tape, a PVB or EVA layer to be heated and softened/melted and thus provide adhering properties, or any other type of adhesive is arranged between the cover 30 and the enclosure device 15. Accordingly, the adhesive layer 19 adhere to the enclosure device 15, such as to the outer side wall 16a surface and/or the surface 15c of the top wall 16b of the enclosure device 15, and to the inner surface 30b of the cover. The adhesive layer 19 here is separate to the adhesive 18 and to the lamination material 11 and may e.g. be placed after the lamination layer 11 and the further sheet has been placed onto the VIG unit, and e.g. before or after the lamination process where the lamination layer 11 is heated to provide a bond between the VIG unit and the further sheet 12.

It is generally understood that in one or more embodiments of the present disclosure, wherein the lamination layer 11 material may flow to bond to the enclosure device 15, such as to the outer surface of a ring wall 16a and/or a top wall 16b of said enclosure device 15 as illustrated and described according to various embodiments of the present disclosure. It is moreover to be understood that the lamination layer 11 material may flow into the recessed portion 8 (see FIGS. 11-13) and here provide a bonding between a surface, such as the wall surface 6a of this recessed portion 8 and/or the surface 8a, and the enclosure device 15. In FIG. 14, the material 11 does not bond to a surface in the recessed portion 8.

It is generally understood that in one or more embodiments of the present disclosure, the cover member 30 may be placed onto/at the further sheet after the lamination process where the lamination layer 11 is heated to provide a bond between the VIG unit and the further sheet 12. In further embodiments of the present disclosure, it may be placed before the lamination process and after the further sheet is placed at the lamination layer or the cover 30 may be attached to the further sheet 12, e.g. by a bonding material 18 prior to placing the further sheet at the lamination layer 11.

FIGS. 15a-15b illustrates schematically a cross sectional view of one or more embodiments of the present disclosure wherein the further sheet 12 comprises a recessed portion 22 in the outer surface 12a of the further sheet 12, and enclosing the hole 13. The cover member 30 such as a plate, disc or the like is placed in the recess 22, and may adhere to a surface of the recessed portion 22 by means of e.g. an adhesive, see e.g. ref. 18 in FIG. 13.

In one or more embodiments, the inner surface 30b of the recessed cover member 30 may e.g. be connected to the enclosure member 15 and/or a 2a11 13a of the hole 13 in the further sheet, e.g. by means of an adhesive member, layer or material 11, 19, e.g. as disclosed in relation to one or more of FIGS. 11-14.

In one or more embodiments of the present disclosure, as illustrated schematically in FIG. 16, where the further sheet 12 is seen from above and towards the outer, major surface 12a of the further sheet 12. The cover member 30 is be held in a fixed position in the recess 22 by means of a friction force/connection between a side edge 30c of the cover member 30 arranged between the inner/lower surface of the cover member 30 for facing the hole 13 and the outwardly facing surface 30a, and a side wall part 22a of the recessed portion 22 in the further sheet. Here, an adhesive to fix the cover member to the glass sheet may e.g. be omitted.

The cover member 30 may accordingly, in one or more embodiments of the present disclosure, be configured to be fixed into the recess 22 due to a resiliency in the cover member material 30 or structure providing that a friction force/connection holds the cover member 30 in place. The cover member 30 may in one or more aspects be connected to the further sheet either alone or in combination with a further attachment arrangement such as an adhesive and/or a mechanical fastener (not illustrated) attaching the cover member 30 to the further sheet 12 and/or the enclosure member 15 as e.g. described above.

FIGS. 17a-17f illustrates schematically a cross sectional view of a cover member 30 according to various embodiments of the present disclosure.

In FIGS. 17a-c, the cover member 30 comprises a recessed part 30d wherein an adhesive material 18, 19 may be placed for connecting the cover member to the laminated VIG unit 100 to cover the recessed portion 8 in the further sheet, the sealing system 7 and the enclosure device 15 (not illustrated in FIGS. 17a.17f).

In FIG. 17a, the adhesive 18 may be an annular adhesive ring/layer 18 that is arranged to adhere to a surface of the further sheet 12, see e.g. one or more of the figures described in the above such as one or more of FIGS. 1-3 or FIG. 12.

In FIG. 17b, the adhesive layer/tape/material 18 for connecting to a surface of the further sheet 12 may cover some or substantially the entire inner surface 30b of the cover member for facing the hole 13 and VIG unit.

In FIG. 17c, the cover member 30 comprises an adhesive material such as an adhesive tape, a PVB or EVA layer (to be melted/softened by heat to adhere), a flexible cushion or the like with an adhesive layer thereon or the like attached to the inner surface 30b of the cover member 30. This adhesive part 19 is configured to connect and adhere to the enclosure device 15 (not illustrated in FIGS. 17a-17f), such as to a top surface 15, so that the cover member will be kept at least partly in place by means of this material 19.

In FIG. 17d, the cover member 30 is merely a substantially flat/plane plate/disc, e.g. with rounded edges 30c. The plate may comprise an adhesive ring or layer as illustrated in FIGS. 17a-17c (not illustrated in FIG. 17d), or this may be omitted, and/or the plate/disc may be attached to the enclosure member 15 by means of the adhesive material 19, se e.g. the above description.

In FIG. 17e, the cover member comprises a rounded/curved major top surface 30a, which round outwards and away from the inner surface 30b between opposite edges 30c so as to provide a more smooth transition between the outer major surface 12a of the further sheet 12, and the cover member.

In FIG. 17f, the outer surface 30a substantially plane. The thickness of the cover member 30 may in one or more embodiments of the present disclosure be a bit below the plane, above the plane, or alternatively substantially in a plane P1 (see FIG. 15a or FIG. 5) defined by the outer major surface 12a of the further sheet when the cover member is placed, e.g. if the cover member 30 is configured to be placed in a recessed part 22 of the further sheet 12.

FIG. 18 illustrates schematically a cross sectional view of a cover member 30 according to various embodiments of the present disclosure.

The cover member 30 has a width W5 that is larger than the width/diameter between opposing the inner walls 13a of the hole 13 in the further sheet 12 so as to be able to be attached to the further sheet 12 either a surface in a recessed portion 22 (see e.g. previous description) or at the major surface 12a of the further sheet 12. The width W5 may in one or more aspects of the present disclosure be above 8 mm such as above 10 mm, e.g. above 13 mm such as above 15 mm.

The width/diameter W5 may in one or more aspects of the present disclosure be below 30 mm such as below 20 mm, e.g. below 18 mm such as about or below 15 mm. For example, in one or more embodiments of the present disclosure, the width W5 may be between 8 mm and 30 mm, such as between 9 mm and 20 mm, e.g. between 10 and 15 mm.

In one or more embodiments of the present disclosure, the width W5 may be between 1% and 40%, such as between 5% and 30%, e.g. between 10% and 20% larger than the width W2 of the hole 13.

The height H3 of the cover member 30 may in one or more aspects of the present disclosure be between 0.3 mm and 5 mm, such as between 0.5 mm and 2 mm, e.g. between 0.7 mm and 1.3 mm. The height H3 may e.g. be defined by the thickness of the cover member 30 material alone, or alternative the sum of the thickness of the cover member 30 material combined with the thickness/height of a recessed part 30d, dependent on the type of the cap, see e.g. previous description.

FIG. 19 illustrates an embodiment of the present disclosure, wherein the enclosure device 15 encloses the sealing system 7, and where the surface 2a at which the enclosure device 15 is placed does not comprise a recessed portion 8. Thus, the enclosure device 15 is placed at the outer major surface 20a of the first sheet 2a to cover the sealing system 7, and is attached to this surface 20a by means of an adhesive 17.

The enclosure device 15 may provide protection of the area of the sealing system 7 and the area of the glass sheet 2a around the evacuation hole 6 during a cleaning operation to clean the surface 20a of the VIG unit by means of e.g. one or more fluids prior to applying the lamination layer 11 to the surface 20a and applying the further glass sheet 12.

When these 11, 12 are provided after the cleaning of the surface 20, they are arranged so that the enclosure device 15 extends into the hole 13 in the further sheet 12.

The cover 30, such as a plate, disc or cap may be attached to the further sheet 12 for covering the hole 13 and the enclosure device 15 (and thus also sealing system) before the further sheet 12 is placed, or the cover 30 may be placed after the further sheet 12 is placed and either prior to or after the lamination process where the lamination layer is heated, is provided.

FIG. 20 illustrates a flowchart relating to providing a laminated vacuum insulated glass (VIG) unit (100) according to one or more embodiments of the present disclosure.

In the first Step S21, the VIG unit is provided. In the second step S22, the enclosure device 15 is placed either in a recessed portion or at the major outer surface of the first glass sheet of the VIG unit (see e.g. FIG. 19), for example by use of an adhesive 17, so as to cover the sealing system 7.

In the third step S23, the first surface containing the evacuation hole 6 and to be laminated is cleaned. This cleaning may comprise placing the VIG unit at a cleaning station. Here, a fluid such as a liquid and/or a gas is used for cleaning the first surface of the glass sheet to be laminated. For example, a liquid containing a cleaning agent such as one or more detergents, e.g. soap and/or an alcohol, pure water or the like may be used. For example a heated liquid heated to between 40° C. and 99° C. may be used for the cleaning. E.g. cleaning with Deionized water (DI water) may be used during the cleaning. The gas may e.g. comprise a pressurized gas for blowing particles or other contaminates away from the surface. For example, steam may also be used for the cleaning in embodiments of the present disclosure. A fabric material and/or one or more brushes may also in embodiments of the present disclosure be used as cleaning devices 91 (see FIG. 21) during the cleaning.

In one or more embodiments of the present disclosure, the cleaning may also comprise a subsequent drying step where a drying is provided by gas such as air applied by one or more nozzles or air knives to dry the surface to be laminated, and/or one or more wiping operations by means of a fabric and/or the like.

In one or more embodiments of the present disclosure, the above mentioned cleaning step may be provided in an at least partly automatized cleaning device/station 90 (see FIG. 21). And a transportation system such as rollers, a conveyer belt and/or the like may move the VIG unit during the cleaning process. The VIG unit with the attached enclosure device 15 is placed on the transportation system and hereby moved into this cleaning device by means of the transportation system, where it is washed, and for example also dried, before it leaves the cleaning device again.

In steps S24 and S25, after the cleaning, the lamination layer is placed (S24: PL LAMI) and the further sheet (S25:PL FS) is placed so that the lamination layer 11 is between the further glass sheet and the cleaned VIG unit glass sheet comprising the enclosure device. In step 26 (H LAMI), the lamination layer is heated to soften to provide a laminated VIG unit.

In step S27 (REM LAMI VIG), the now laminated VIG unit is removed from the heating arrangement. After step 27, or between step S26 and S27, the cover 30 may be placed, but it may also instead be placed e.g. between step S25 and step S26, or it may be attached to the further sheet even prior to step S25.

A transportation system 94 such as rollers, a conveyer belt and/or the like moves the VIG units 1 at the transportation system, e.g. while the VIG unit major surfaces are kept either substantially horizontally or substantially vertically or at an orientation there between dependent on the transportation system 94 type.

FIG. 21 illustrates schematically a cleaning process according to one or more embodiments of the present disclosure, see e.g. also the description above of FIG. 20.

As can be seen, the cleaning at step S23 may comprise that one or more cleaning devices 91, such as fabric materials and/or brushes, e.g. rotating and/or reciprocating brushes, such as one or more cylinder brushes and/or cup brushes and/or the like moved/controlled by motors and/or actuators in the station 90 may in embodiments of the present disclosure be used for cleaning the first surface during the cleaning in the cleaning device/station 90 comprising a housing 93 wherein the cleaning is performed. The housing 93 may comprise an inlet opening and an outlet opening for letting VIG units with enclosure devices 15 into the interior of the cleaning device/station 90, and out through the outlet opening of the cleaning device/station 90 after the cleaning.

The cleaning device/station 90 may also comprise one or more spraying or shower devices 92 for providing cleaning fluids such as one or more liquids, such as e.g. heated liquids or unheated liquids comprising cleaning agents, deionized water and/or a cleaning, e.g. pressurized gas as e.g. described above.

As can be seen, the enclosure device 15 may in one or more embodiments of the present disclosure be placed to enclose the sealing system according to one or more embodiments of the present disclosure, prior to the cleaning, e.g. manually by human hand, or by a placing system 95 e.g. comprising a robotic arm, a linear actuator system and/or the like, for example an automated pick-and-place solution.

FIG. 22 illustrates schematically a building 80 seen from the outside/exterior, comprising apertures 81 for windows 82 and a door 83 in the outer wall 84 of the building 80. The building also comprises a roof structure 85 comprising a roof window 82a. The windows and doors may be referred to as building aperture coverings.

The apertures 81 are covered by one or more laminated VIG units 100 as disclosed according to one or more of the embodiments of the present disclosure. The VIG units 100 are placed in a frame 71, and the frame 71 is then attached by fastening parts (not illustrated) such as mechanical fastening parts in the form of one or more hinges, screws, nails, mounting and/or the like to the wall 84 or a part of the roof structure 85 dependent on the aperture covering type (e.g. a roof window 82a). Generally, it is to be understood that the glass sheets described in this document and used for VIG assemblies/units may in one or more embodiments of the present disclosure be transparent to light such as light having a wavelength in the range of about 400 nm to 700 nm to at least such a degree which enables humans to see through the glass sheets of the VIG unit. Also the glass sheets may be configured so that infrared light (about 700 nm to 1 mm) is transmitted through the glass sheet, or reflected.

One or more of the glass sheets may e.g. comprise a low-E coating for improving the U-value of the VIG. The low E coating may be arranged at a major surface of one of the VIG unit glass sheets 2a, 2b, and faces the gap between the glass sheets.

In further embodiments of the present disclosure, the laminated VIG units manufactured in accordance with one or more of the embodiments described in this document may be used for e.g. refrigerator units or ovens such as conventional household ovens as e.g. windows allowing viewing into the interior of such appliances.

Generally, at least for the roof windows, the window may be configured to be arranged so that the further sheet 12 and thus the enclosure device 15 and cover 30 (if used) faces the interior of the building, but in further embodiments, the window may be configured to be arranged so that the further sheet 12 and thus the enclosure device 15 and/or cover 30 faces away from the interior of the building. The same may apply for the windows and/or door in the outer walls of the building.

It is generally understood that the enclosure device 15 and/or the cover/cover member 30 may provide a sealing protector for protecting the sealing system from being broken during lamination, and or/after lamination. the enclosure device may also or alternatively, as e.g. described above, be used for protecting the sealing system 7 and an area around the evacuation opening during a cleaning operation for cleaning the outer major surface 20a of the first glass sheet 2a of the VIG unit to be laminated, prior to the lamination, and e.g. before the cover 30 is placed. The enclosure device 15 may thus also e.g. act as a cleaning/washing protector device during the cleaning prior to the lamination process.

FIG. 23 is an image/photo of a test sample of a laminated VIG unit 1 provided according to embodiments of the present disclosure. As can be seen, the further glass sheet 12 comprises a hole 13. The enclosure device 15 comprises an annular side wall 16a, and a top wall 16b, enclosing the sealing system 7, and hence, the sealing system is not visible in FIG. 23. The enclosure device 15 extends into the hole 13 in the further sheet 12. As can be seen, the lamination material 11 has flown in and abuts, and possibly bonds to, a part of the outer wall 16a surface during the lamination process where the lamination material 11 is heated to be softened, and may hence also extend into the space in the hole 13 in the further glass sheet/lamination glass 12. The lamination material 11 may in embodiments flow in over a connection flange (16d—not shown in FIG. 23, see prior description) providing a connection surface 16f facing the glass sheet of the VIG unit comprising the evacuation hole.

It is generally understood that the embodiment illustrated in FIG. 23 may be applied both in cases where the enclosure device 15 extends into a recessed portion 8 of a glass sheet (2a—not visible in FIG. 23), and in other embodiments where the recessed portion may be omitted, see e.g. FIG. 19. Additionally, or alternatively it may apply in a solution where a cover 30 (not included in in FIG. 23, see previous description and FIGS. 11-19) is used, and in solutions where such a cover may be omitted. The result that the lamination material flows in to abut the enclosure device 15 as for example shown in FIG. 23 may e.g. help to provide an improved sealing and/or protection of the sealing system inside the enclosure device's interior space 15a (not visible in FIG. 23) during manufacturing of the laminated VIG unit and/or after manufacturing of the laminated VIG unit.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A laminated vacuum insulated glass (VIG) unit comprising
    a vacuum insulated glass unit comprising first and second glass sheets separated by support structures to provide a gap between the glass sheets, and an edge-sealing enclosing and sealing said gap,
    a recessed portion in an outer surface of the first glass sheet,
    an evacuation hole arranged in said first glass sheet and extending from the recessed portion to the gap,
    a sealing system sealing the evacuation hole, wherein the sealing system is arranged in said recessed portion and,
    a lamination layer arranged between a further sheet and the first glass sheet comprising said evacuation hole,
    wherein a part of said sealing system extends into a hole in the further sheet,
    wherein an enclosure device comprising one or more walls encloses at least a part of said sealing system and extends into said hole in the further sheet and into said recessed portion, and
    wherein said enclosure device is attached to one or more surfaces of said recessed portion by means of an adhesive.

2. A laminated vacuum insulated glass (VIG) unit according to claim 1, wherein said enclosure device comprises a connection flange providing a connection surface connected to a surface of said recessed portion.

3. A laminated vacuum insulated glass (VIG) unit according to claim 1, wherein said enclosure device comprises a top wall extending over the top of the sealing system so as to cover the top of the sealing system.

4. A laminated vacuum insulated glass (VIG) unit according to claim 1, wherein the top of said enclosure device is arranged to be below or in the level of a plane defined by the outer major surface of the further sheet.

5. A laminated vacuum insulated glass (VIG) unit according to claim 1, wherein a cover is fixed to one or more parts of the laminated VIG unit and covers said sealing system and enclosure device.

6. A laminated vacuum insulated glass (VIG) unit according to claim 5, wherein said cover is recessed in the outer major surface of said further sheet.

7. A laminated vacuum insulated glass (VIG) unit according to claim 1, wherein said sealing system comprises an evacuation tube and a sealing portion providing a seal between the evacuation tube and the first glass sheet comprising said recessed portion.

8. A laminated vacuum insulated glass (VIG) unit according to claim 1, wherein said glass sheets of the VIG unit are tempered glass sheets.

9. A laminated vacuum insulated glass (VIG) unit according to claim 1, wherein the lamination layer material bonds to said enclosure device.

* * * * *